US012189322B2

(12) United States Patent
Takahashi

(10) Patent No.: US 12,189,322 B2
(45) Date of Patent: Jan. 7, 2025

(54) IMAGE FORMING APPARATUS

(71) Applicant: CANON KABUSHIKI KAISHA, Tokyo (JP)

(72) Inventor: Ryosuke Takahashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/063,790

(22) Filed: Dec. 9, 2022

(65) Prior Publication Data

US 2023/0195024 A1 Jun. 22, 2023

(30) Foreign Application Priority Data

Dec. 20, 2021 (JP) ................................ 2021-205728

(51) Int. Cl.

| | |
|---|---|
| ***G03G 15/00*** | (2006.01) |
| ***G03G 15/02*** | (2006.01) |
| ***G03G 21/16*** | (2006.01) |
| ***G03G 21/18*** | (2006.01) |

(52) U.S. Cl.

CPC ......... *G03G 15/80* (2013.01); *G03G 15/0283* (2013.01); *G03G 21/1619* (2013.01); *G03G 21/1652* (2013.01); *G03G 21/1867* (2013.01)

(58) Field of Classification Search

CPC ............... G03G 15/80; G03G 21/1619; G03G 21/1652; G03G 15/50; G03G 15/5004; G03G 15/5037; G03G 21/1609; G03G 2215/0643; G03G 2221/16; G03G 15/0283; G03G 21/1867; G03G 2215/00978; G03G 2221/1684; G03G 2221/1869; G03G 2221/166

See application file for complete search history.

(56) References Cited

U.S. PATENT DOCUMENTS 6,006,060 A * 12/1999 Sato .................. G03G 15/0812 399/284
11,106,173 B2 8/2021 Sekiya
2007/0154232 A1* 7/2007 Buchanan .......... G03G 21/1676 399/90

(Continued)

FOREIGN PATENT DOCUMENTS

JP 2016012066 A 1/2016
JP 2021051328 A 4/2021
JP 2021086068 A 6/2021

*Primary Examiner* — Arlene Heredia
*Assistant Examiner* — Laura Roth
(74) *Attorney, Agent, or Firm* — ROSSI, KIMMS & McDOWELL LLP

(57) ABSTRACT

An image forming apparatus includes an operation unit including a contact of the operation unit, a voltage control board including a contact of the voltage control board, a wire electrically connecting the voltage control board and the operation unit, a first holding unit configured to hold a first end of the wire electrically connected to the contact of the voltage control board, and a second holding unit configured separately from the first holding unit, the second holding unit configured to hold a second end of the wire electrically connected to the contact of the operation unit. The wire does not linearly connect the first holding unit and the second holding unit. At least one portion, of the wire, between the first holding unit and the second holding unit is not held by the first holding unit and the second holding unit.

16 Claims, 24 Drawing Sheets

(56) References Cited

U.S. PATENT DOCUMENTS

| | | | | |
|---|---|---|---|---|
| 2015/0378303 | A1* | 12/2015 | Ohata | H01B 1/02 174/126.1 |
| 2016/0216680 | A1* | 7/2016 | Uchida | G03G 21/1867 |
| 2017/0307996 | A1* | 10/2017 | Sato | F16F 1/125 |

* cited by examiner

IMAGE FORMING APPARATUS

BACKGROUND OF THE INVENTION

Field of the Invention

The present invention relates to an image forming apparatus that forms an image on a sheet.

Description of the Related Art

For example, according to JP 2021-51328 A, an electrophotographic image forming apparatus includes an operation unit that performs various operations related to image formation according to voltage supply, and a printed circuit board that controls and supplies a voltage supplied from an external power supply to the operation unit. On the printed circuit board, a board contact for conduction with each operation unit is formed for each operation unit of the voltage supply destination. The board contact of a printed circuit board and the operation unit contact of the operation unit are electrically connected by a power supply line.

The power supply line has a first end connected to the board contact via a first spring and the second end connected to the operation unit contact via a second spring. The power supply line is held by a holding portion from a first end to the second end, and the holding portion also holds the first spring and the second spring.

The holding portion is large in size because the holding portion holds the entire power supply line. In addition, since the power supply line is not insulated and coated, the holding portion needs to be formed of, for example, an insulating and flame-retardant member. Such a holding portion causes an increase in cost. Further, the power supply line is held by the holding portion at a plurality of positions between the first end and the second end. At the time of assembling the image forming apparatus, there is a case where the installation positions of the printed circuit board and the operation unit are changed due to a manufacturing error or the like. In such a case, there is a possibility that the power supply lines held at a plurality of positions with respect to the holding portion cannot appropriately supply a voltage to the operation unit.

SUMMARY OF THE INVENTION

According to one aspect of the present invention, an image forming apparatus configured to form an image on a recording material, the image forming apparatus includes an operation unit configured to operate in response to supply of a voltage, the operation unit including a contact of the operation unit, a voltage control board configured to control a voltage supplied from an external power supply to apply the voltage to the operation unit, the voltage control board including a contact of the voltage control board, a wire electrically connecting the voltage control board and the operation unit, a first holding unit configured to hold a first end of the wire electrically connected to the contact of the voltage control board, and a second holding unit configured separately from the first holding unit, the second holding unit configured to hold a second end of the wire electrically connected to the contact of the operation unit. The wire does not linearly connect the first holding unit and the second holding unit. At least one portion, of the wire, between the first holding unit and the second holding unit is not held by the first holding unit and the second holding unit.

Further features of the present invention will become apparent from the following description of exemplary embodiments with reference to the attached drawings.

DESCRIPTION OF THE EMBODIMENTS

Hereinafter, exemplary embodiments for carrying out the present invention will be exemplarily described in detail with reference to the drawings. However, the dimensions, materials, shapes, and relative arrangements of the components described in the exemplary embodiment should be appropriately changed according to the configuration of the device to which the invention is applied and various conditions. That is, the scope of the present invention is not intended to be limited to the following exemplary embodiments.

First Exemplary Embodiment

Image Forming Apparatus

Figure 1:
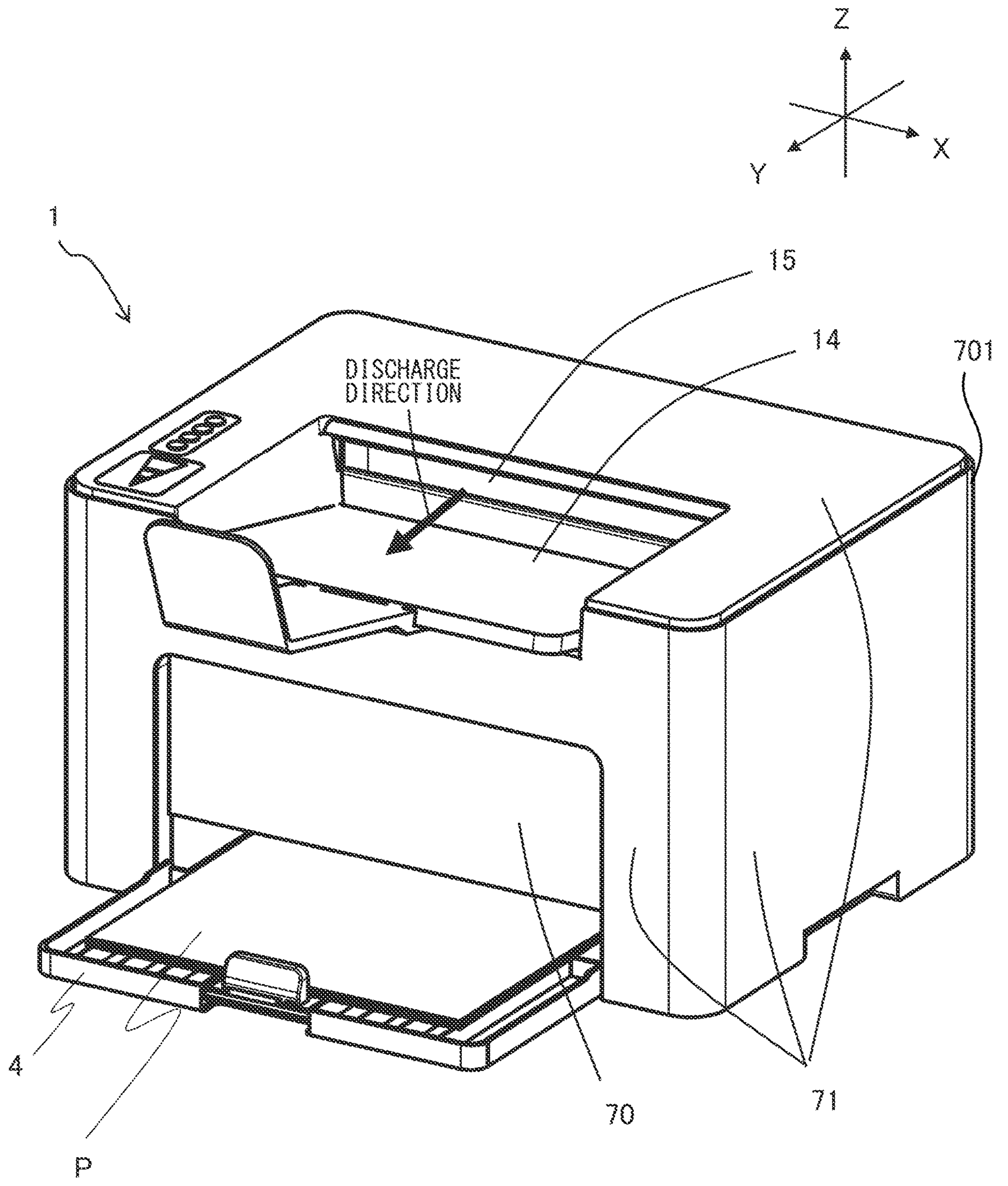
FIG. 1 is an external perspective view illustrating an image forming apparatus.
Figure 2:
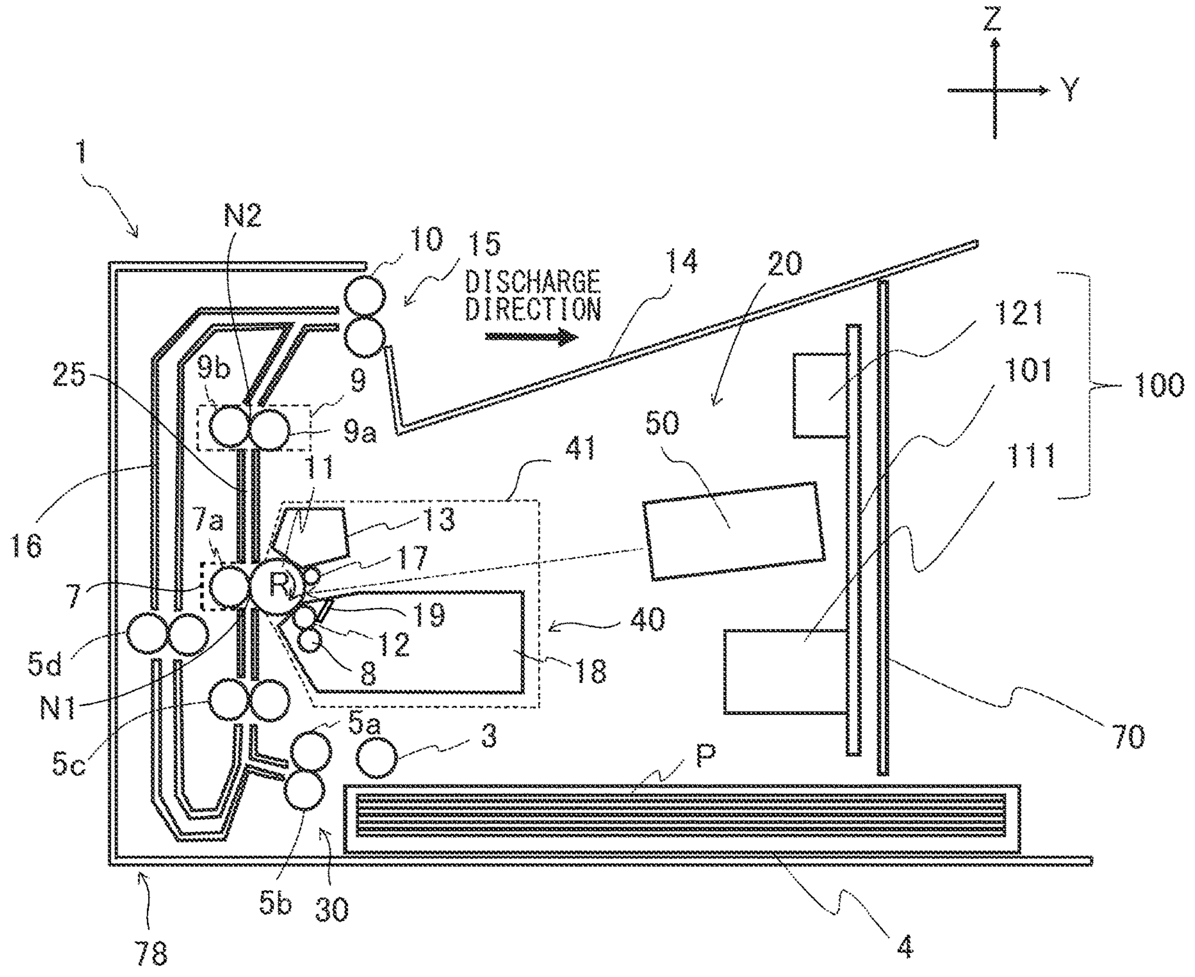
FIG. 2 is a schematic diagram illustrating a configuration of an image forming apparatus.

First, an outline of an image forming apparatus of the present exemplary embodiment will be described with reference to FIGS. 1 and 2. FIG. 1 is an external perspective view illustrating an image forming apparatus 1 according to the present exemplary embodiment. FIG. 2 is a cross-sectional view illustrating a configuration of the image forming apparatus 1. The image forming apparatus 1 of the present exemplary embodiment is a monochrome laser beam printer that forms an image on a recording material P on the basis of image information input from an external apparatus (not illustrated) such as a personal computer. Examples of the recording material P for forming an image include paper such as plain paper and thick paper, plastic films such as a sheet for an overhead projector, and sheet materials of various materials such as cloth.

In the following description, a height direction (a direction opposite to the vertical direction) of the image forming apparatus 1 when the image forming apparatus 1 is installed on a horizontal surface is referred to as a Z direction. A direction that intersects with the Z direction and is parallel to a rotation axis direction (main scanning direction, width direction) of a photosensitive drum 11 (see FIG. 2) to be described later is defined as an X direction. A direction intersecting the X direction and the Z direction is defined as a Y direction. The X direction, the Y direction, and the Z direction preferably intersect perpendicularly to each other. For convenience, a plus side in the X direction is referred to as a right side, a minus side in the X direction is referred to as a left side, a plus side in the Y direction is referred to as a front side or a front side, a minus side in the Y direction is referred to as a rear side or a back side, a plus side in the Z direction is referred to as an upper side, and a minus side in the Z direction is referred to as a lower side.

As illustrated in FIG. 1, the image forming apparatus 1 includes a cassette 4 in which the recording material P is stored, and a sheet discharge tray 14 on which the discharged recording material P is stacked. The cassette 4 is provided so as to be drawn out in the Y direction, and the user can replenish the recording material P to the cassette 4. The recording material P conveyed from the cassette 4 is discharged from a discharge port 15 in the discharge direction (Y direction) after image formation, and is stacked on the sheet discharge tray 14. The discharge port 15 through which the recording material P discharged to the sheet discharge tray 14 passes is formed on the upper surface of a support frame body 78 (see FIG. 3 described later). That is, the image forming apparatus 1 of the present exemplary embodiment is an upper-surface ejection type apparatus.

The image forming apparatus 1 includes the support frame body 78, and a front cover 70, a back cover 701, and an exterior cover 71 are attached to the support frame body 78. The exterior cover 71 is disposed on a side surface or a top surface of the image forming apparatus 1 and constitutes an exterior of the image forming apparatus 1 together with the front cover 70 and the back cover 701. The front cover 70 is provided on a part of the end surface on the front side of the image forming apparatus 1, and covers a circuit board 100 described later.

As illustrated in FIG. 2, the image forming apparatus 1 includes an image forming unit 20 that forms a toner image on the recording material P, a feeding unit 30 that feeds the recording material P, a fixing unit 9 that fixes the toner image formed by the image forming unit 20 to the recording material P, and a sheet discharge roller pair 10. The image forming unit 20, the feeding unit 30, the fixing unit 9, and the sheet discharge roller pair 10 are provided in the support frame body 78.

The image forming unit 20 includes an exposure unit 50, an electrophotographic process unit 40, and a transfer unit 7 including a transfer roller 7*a* as a transfer unit that transfers the toner image borne on the photosensitive drum 11 of the process unit 40 to the recording material P The process unit 40 includes a photosensitive drum 11 as an image bearing member, a charge roller 17 as a charging unit, a discharging device 13 as a discharging unit, a developing roller 12 as a developing unit, a supply roller 8, a developing blade 19 as a restricting unit, and a developing container 18 that stores toner. In the process unit 40 as a cartridge, the photosensitive drum 11, the charge roller 17, the discharging device 13, the developing roller 12, the supply roller 8, the developing blade 19, and the developing container 18 are supported by a support unit 41, and the support unit 41 is detachably provided with respect to the support frame body 78.

The photosensitive drum 11 is a photosensitive member molded in a cylindrical shape. The photosensitive drum 11 of the present exemplary embodiment has a photosensitive layer formed of a negatively charged organic photosensitive member on a drum-shaped substrate formed of aluminum. The photosensitive drum 11 is rotationally driven at a predetermined process speed in a predetermined direction (direction of arrow R) by a motor (not illustrated).

The charge roller 17 is in contact with the photosensitive drum 11 with a predetermined pressure contact force, and generates a discharge between the charge roller and the photosensitive drum 11 in response to application of a charging voltage by the circuit board 100 to uniformly charge the surface of the photosensitive drum 11 to a predetermined potential.

The discharging device 13 is disposed downstream of the transfer roller 7*a* and upstream of the charge roller 17 in the rotation direction of the photosensitive drum 11. In order to generate stable discharge between the charge roller 17 and the photosensitive drum 11, the discharging device 13 discharges the surface potential of the photosensitive drum 11 before charging according to the application of the discharging voltage by the circuit board 100.

The exposure unit 50 scans and exposes the surface of the photosensitive drum 11 by irradiating the photosensitive drum 11 with a laser beam corresponding to image information input from an external apparatus. By this exposure, an electrostatic latent image corresponding to image information is formed on the surface of the photosensitive drum 11.

The developing roller 12 is rotatably supported by the developing container 18. The developing container 18 stores a developer including a toner and a carrier. The developing roller 12 is disposed in the opening portion of the developing container 18 so as to face the photosensitive drum 11. The supply roller 8 is in contact with the developing roller 12. The supply roller 8 rotatably abuts on the developing roller 12, and is rotatably supported by the developing container 18 while bearing toner in order to supply the toner from the developing container 18 to the developing roller 12. A toner supply voltage is applied to the supply roller 8 by the circuit board 100. The toner is applied to the surface of the developing roller 12 by the supply roller 8 to which the toner supply voltage is applied. Note that the supply roller 8 is not necessarily required as long as the toner can be sufficiently supplied to the developing roller 12.

The process unit 40 uses a contact development method as a development method. That is, the toner borne on the developing roller 12 comes into contact with the photosensitive drum 11 at a developing portion (developing region) where the photosensitive drum 11 and the developing roller 12 face each other. A developing voltage is applied to the developing roller 12 by the circuit board 100. Under the developing voltage, the toner borne on the developing roller 12 is transferred from the developing roller 12 to the surface of the photosensitive drum 11 according to the potential distribution on the surface of the photosensitive drum, whereby the electrostatic latent image is developed into the toner image.

In the opening portion of the developing container 18, the developing blade 19 is disposed with a predetermined gap from the surface of the developing roller 12. A developing blade voltage is applied to the developing blade 19 by the circuit board 100 to restrict the amount of toner borne on the developing roller 12, that is, the thickness of the toner. The toner supplied to the developing roller 12 by the supply roller 8 passes through a portion facing the developing blade 19 with the rotation of the developing roller 12, so that the toner is thinned to a uniform thickness on the surface of the developing roller 12.

The fixing unit 9 heats and melts the toner on the recording material and applies pressure to fix the image. The fixing unit 9 includes a heating roller 9*a* incorporating a fixing heater 9*c*, and a pressure roller 9*b* making pressure contact with the heating roller 9*a*.

Next, an image forming operation of the image forming apparatus 1 will be described. When an image forming command is input to the image forming apparatus 1, the image forming process by the image forming unit 20 is started on the basis of image information input from an external apparatus (not illustrated) connected to the image forming apparatus 1.

The exposure unit 50 irradiates the photosensitive drum 11 with laser light on the basis of the input image information. Although not illustrated, the exposure unit 50 includes a laser oscillator that outputs a laser beam, a polygon mirror and a lens for irradiating the photosensitive drum 11 with the laser beam, a scanner motor that rotates the polygon minor, a housing that houses and integrally supports these components, and the like.

The photosensitive drum 11 is charged by the charge roller 17, and is irradiated with laser light by the exposure unit 50, whereby an electrostatic latent image is formed on the surface of the photosensitive drum 11. Thereafter, the electrostatic latent image is developed by the developing roller 12 that rotates while carrying the toner image, and the toner image is formed on the photosensitive drum 11.

The feeding unit 30 includes a cassette 4 on which the recording material P is loaded, a pickup roller 3, a feeding roller 5*a*, and a separation roller 5*b*. In parallel with the above-described image forming process, the pickup roller 3 feeds the recording material P supported by the cassette 4. The recording material P fed by the pickup roller 3 is separated one by one by the feeding roller 5*a* and the separation roller 5*b*, and is conveyed to a conveyance roller pair 5*c*. Then, the recording material P is conveyed by the conveyance roller pair 5*c* toward the transfer nip N1 formed by the transfer roller 7*a* and the photosensitive drum 11.

A transfer voltage is applied to the transfer roller 7*a* by the circuit board 100, and the toner image borne on the photosensitive drum 11 is transferred to the recording material P conveyed by the conveyance roller pair 5*c*. The recording material P to which the toner image has been transferred is conveyed to the fixing unit 9, and the toner image is heated and pressurized when passing through a fixing nip N2 between the heating roller 9*a* and the pressure roller 9*b* of the fixing unit 9. As a result, the toner is melted and then fixed, whereby the toner image is fixed on the recording material P The recording material P having passed through the fixing unit 9 is discharged from the discharge port 15 toward the discharge direction (Y direction) by the sheet discharge roller pair 10, and is stacked on the sheet discharge tray 14.

In a case where images are formed on both surfaces of the recording material P, the sheet discharge roller pair 10 guides the recording material P to a duplex conveyance path 16 by switching back the recording material P on which an image is formed on the first surface. The recording material P guided to the duplex conveyance path 16 is conveyed again toward the transfer roller 7*a* via the conveyance path 25 by a duplex conveyance roller pair 5*d*. After an image is formed on the second surface of the recording material P by the transfer roller 7*a*, the recording material P is discharged to the outside of the apparatus by the sheet discharge roller pair 10. After the toner image is transferred to the recording material P, the toner remaining on the photosensitive drum 11 is cleaned by a cleaning unit (not illustrated).

As illustrated in FIG. 2, the image forming apparatus 1 includes the circuit board 100. The circuit board 100 has a wiring board 101 made of an insulator, and for example, soldered electric components 111 and 121 are mounted on one surface side of the wiring board 101. Conductor wiring is provided on or inside the wiring board 101, and a large number of electric components 111 and 121 are electrically connected. As will be described in detail later, the circuit board 100 has a function of, for example, converting an alternating current supplied from an external power supply to the image forming apparatus 1 into a direct current, or converting an input voltage in order to obtain a predetermined voltage value necessary for the image forming process.

The circuit board 100 is disposed in a gap formed between the front cover 70 and the exposure unit 50 in the discharge direction, and the surface of the wiring board 101 on which the electric components 111 and 121 are mounted faces the inside of the support frame body 78. The circuit board 100 is disposed such that the surface of the wiring board 101 on which the electric components 111 and 121 are mounted intersects with the discharge direction (Y direction).

Circuit Board

Figure 3:
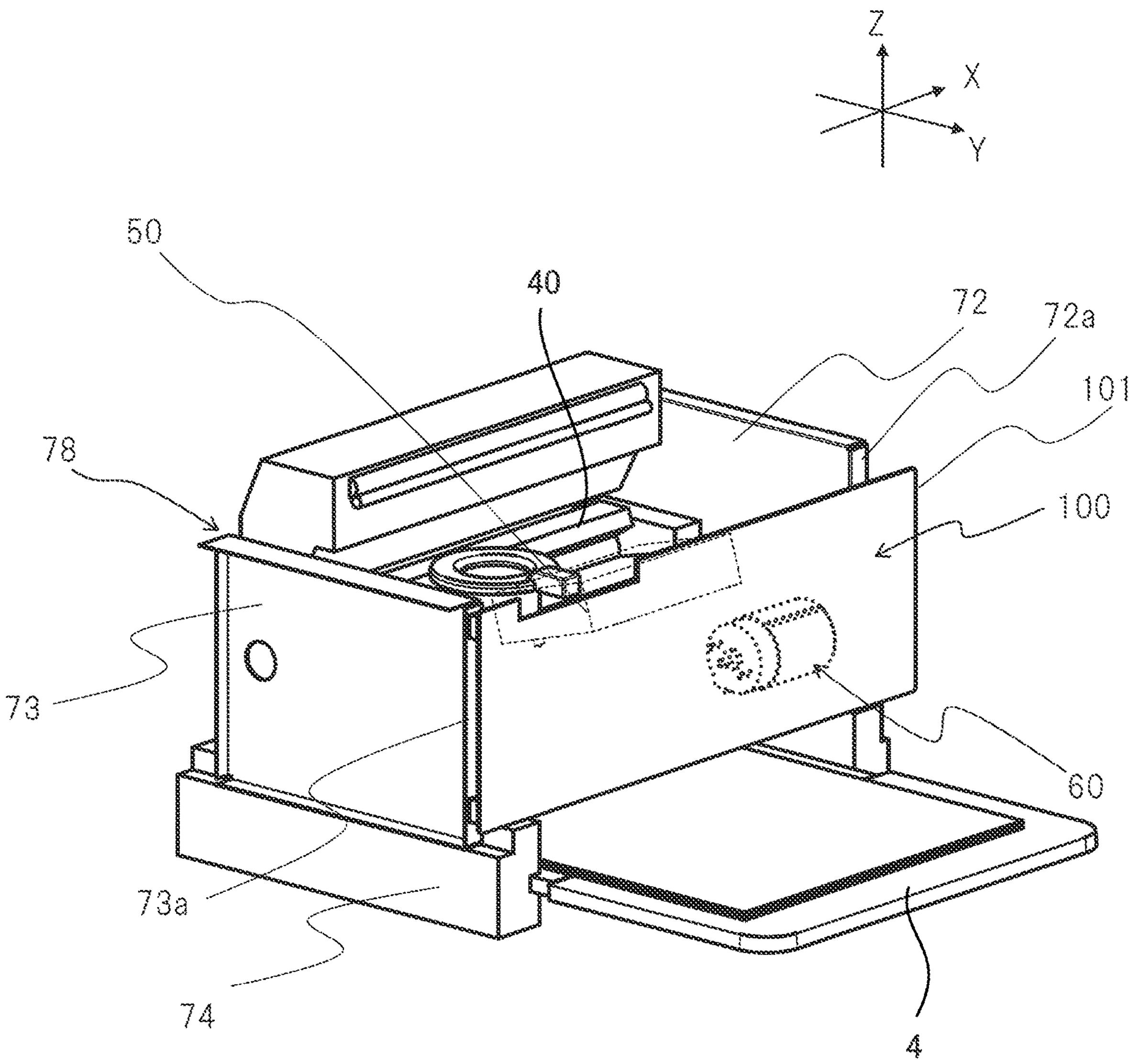
FIG. 3 is a diagram for explaining arrangement of a circuit board.

The arrangement of the circuit board 100 will be described with reference to FIG. 3. FIG. 3 is a diagram for explaining the arrangement of the circuit board 100. However, unlike FIG. 1 described above, FIG. 3 does not illustrate a part of the front cover 70, the exterior cover 71, the sheet discharge tray 14, and the like.

As illustrated in FIG. 3, the support frame body 78 includes a pair of right-side plate frame 72 and left-side plate frame 73 facing each other in substantially parallel, and a base frame 74. The right-side plate frame 72 and the left-side plate frame 73 are erected upward (Z direction) from the base frame 74 disposed on the floor at both ends in the width direction (rotation axis direction of the photosensitive drum) intersecting both the vertical direction and the discharge direction of the recording material P. Although not illustrated here, a plurality of sheet metal stays may be bridged between the right-side plate frame 72 and the left-side plate frame 73 in order to increase the stiffness of the support frame body 78.

In the present exemplary embodiment, the circuit board 100 is disposed on the front side so as to be bridged between the right-side plate frame 72 and the left-side plate frame 73 of the support frame body 78. Distal ends of the right-side plate frame 72 and the left-side plate frame 73 in the Y direction are bent outward to form bent portions 72*a* and 73*a*. The bent portion 72*a* is bent toward the plus side in the X direction so as to be substantially parallel to the XZ plane, and the bent portion 73*a* is bent toward the minus side in the X direction so as to be substantially parallel to the XZ plane. By bending both side plate frames (72, 73) outward in this manner, the circuit board 100 can be disposed on the right-side plate frame 72 and the left-side plate frame 73 via the bent portions 72*a* and 73*a*. The circuit board 100 is disposed such that its plate surface is substantially parallel to the XZ plane.

The process unit 40, the exposure unit 50, the drive motor 60, and the like are disposed on the back side of the support frame body 78 with respect to the circuit board 100. The drive motor 60 is, for example, a drive source that drives the photosensitive drum 11, the charge roller 17, the developing roller 12, the supply roller 8, and the like of the process unit 40, and a plurality of drive motors may be provided, but only one drive motor is illustrated in FIG. 3.

Figure 4:
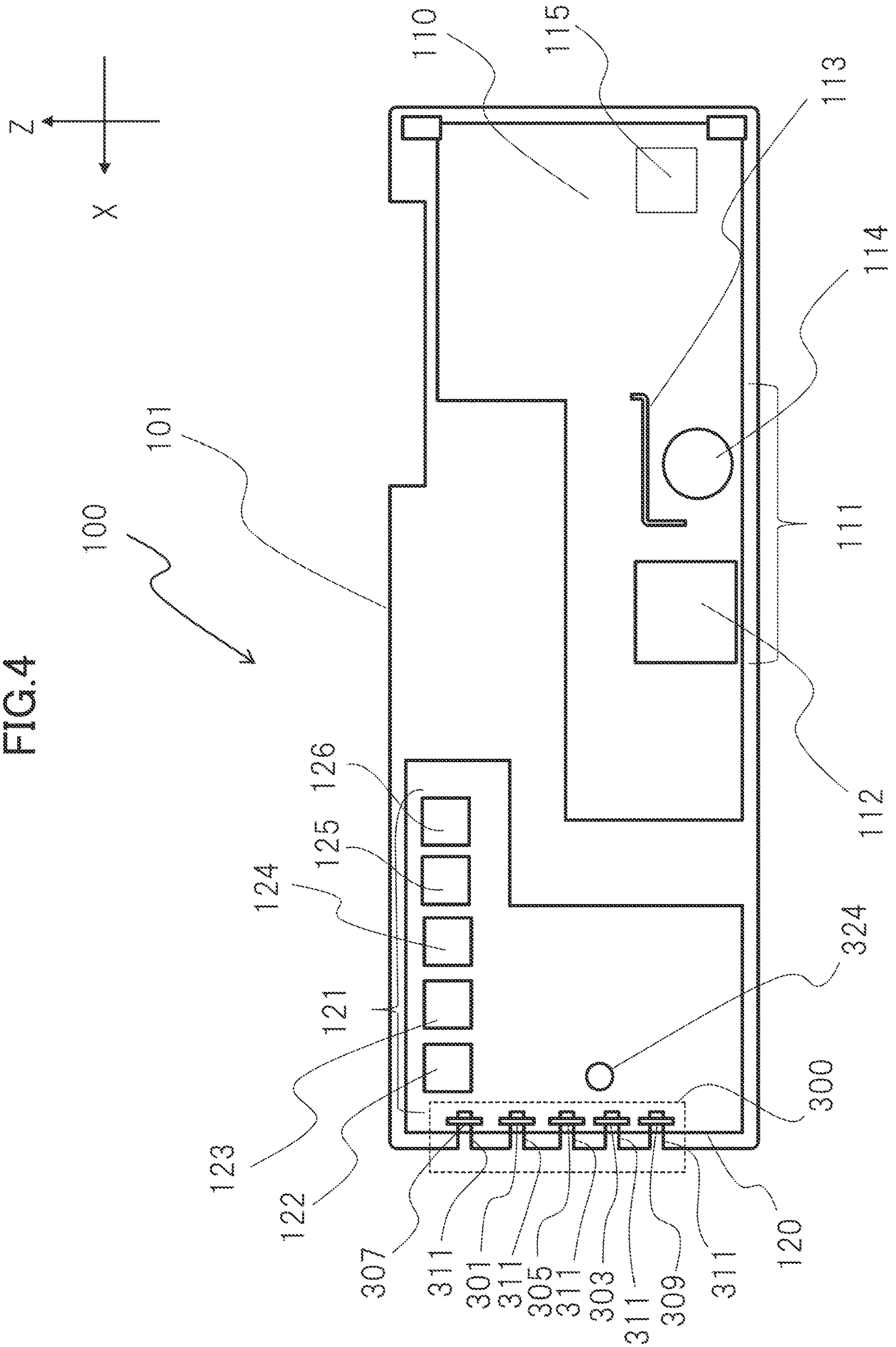
FIG. 4 is a schematic diagram illustrating a circuit board.
Figure 5:
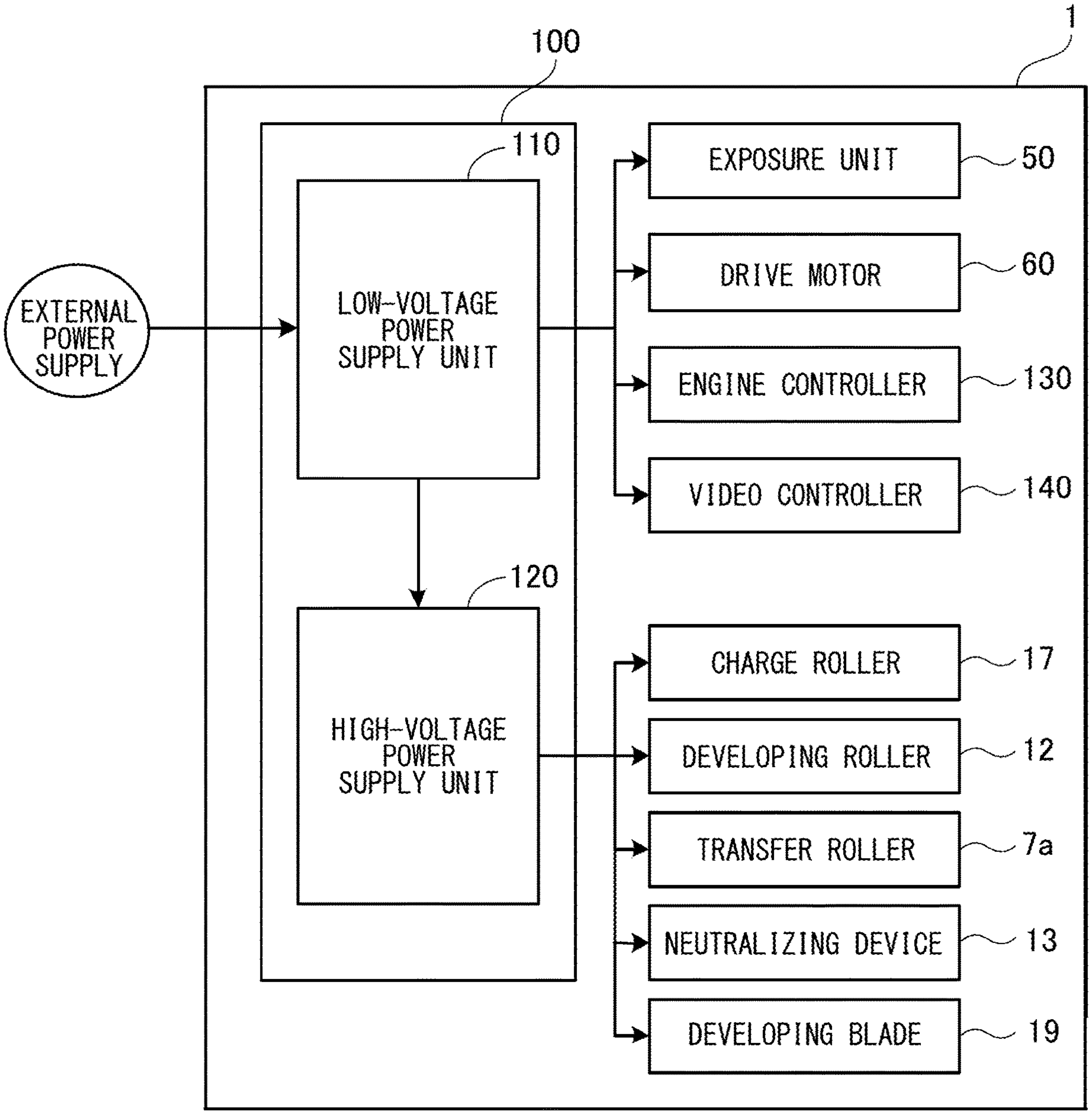
FIG. 5 is a block diagram for explaining a function of a circuit board.

Next, the configuration and function of the circuit board 100 will be described with reference to FIGS. 4 and 5. FIG. 4 is a schematic view illustrating the circuit board 100 when viewed from the back side. FIG. 5 is a block diagram for explaining a function of the circuit board 100.

As illustrated in FIG. 4, the circuit board 100 as a voltage control board includes a low-voltage power supply unit 110 that takes in an AC voltage from an external power supply (see FIG. 5) and converts the AC voltage into a DC voltage, and a high-voltage power supply unit 120 that generates a high voltage necessary for image formation and supplies the high voltage to each operation unit. The low-voltage power supply unit 110 includes, for example, a low-voltage power supply transformer 112, an electrolytic capacitor 114, a power input unit 115, and the like as the electric component 111.

The low-voltage power supply unit 110 converts an AC voltage input from an external power supply via the power input unit 115 into a stable DC voltage by a rectifying and smoothing circuit including the electrolytic capacitor 114. Then, a switching element such as a transistor converts the DC voltage into a high-frequency AC voltage, and outputs the high-frequency AC voltage to the low-voltage power supply transformer 112. The low-voltage power supply transformer 112 converts the input high-frequency AC voltage into an AC voltage (output voltage) having a desired voltage value. The low-voltage power supply unit 110 again converts the AC voltage into a DC voltage, and outputs the obtained DC voltage to the high-voltage power supply unit 120, the exposure unit 50, and the like. The low-voltage power supply unit 110 is provided with a heat sink 113 made of aluminum or iron in order to dissipate heat generated from each circuit component.

The high-voltage power supply unit 120 converts a voltage (for example, 24 V) supplied from the low-voltage power supply unit 110 into a high voltage necessary for an image forming process such as charging, development, and transfer. The high-voltage power supply unit 120 includes, as the elects is components 121, for example, a charging transformer 122, a developing transformer 123, a transfer transformer 124, a discharging transformer 125, a developing blade transformer 126, and the like. The voltage supplied from the low-voltage power supply unit 110 is converted into a charging voltage by the charging transformer 122, a developing voltage by the developing transformer 123, a transfer voltage by the transfer transformer 124, a discharging voltage by the discharging transformer 125, and a developing blade voltage by the developing blade transformer 126. Then, as illustrated in FIG. 5, the high-voltage power supply unit 120 supplies the respective converted voltages to operation units such as the charge roller 17, the developing roller 12, the transfer roller 7*a*, the discharging device 13, and the developing blade 19 that operate according to the supply of the voltages.

In the case of the present exemplary embodiment, as illustrated in FIG. 4, a circuit contact portion 300 is provided on the circuit board 100 in order to apply the converted voltage to each of the above-described operation units. The circuit contact portion 300 is formed of a conductor such as aluminum, for example, and is soldered to the circuit board 100. The circuit contact portion 300 is provided with board contacts of a charging board contact 301, a developing board contact 303, a transfer board contact 305, a discharging board contact 307, and a blade board contact 309. An output current of the charging transformer 122 flows through the charging board contact 301, and an output current of the developing transformer 123 flows through the developing board contact 303. An output current of the transfer transformer 124 flows through the transfer board contact 305, an output current of the discharging transformer 125 flows through the discharging board contact 307, and an output current of the developing blade transformer 126 flows through the blade board contact 309.

The low-voltage power supply unit 110 supplies a voltage (for example, 3.3 V or 5 V) not only to the high-voltage power supply unit 120 but also to the exposure unit 50, the drive motor 60, an engine controller 130, and a video controller 140 as illustrated in FIG. 5. The engine controller 130 integrally controls the entire operation of the image forming apparatus 1 as a main controller. Although not illustrated, the engine controller 130 includes a central processing unit (CPU), a random access memory (RAM) used for calculation of data necessary for controlling the image forming apparatus 1, temporary storage, and the like, a read only memory (ROM) that stores a program for controlling the image forming apparatus 1, various types of data, and the like. The video controller 140 communicates with an external apparatus to receive print data, and notifies the engine controller 130 of a result of analyzing the print data. The engine controller 130 may be provided on a board different from the circuit board 100, or may be provided on the same board.

In the present exemplary embodiment, the configuration in which the low-voltage power supply unit 110 and the high-voltage power supply unit 120 are provided on the same board (circuit board 100) has been described, but the present invention is not limited thereto. These two power supply units may be provided on another board. Both the board on which the low-voltage power supply unit 110 is mounted and the board on which the high-voltage power supply unit 120 is mounted may be disposed on the front side of the image forming apparatus 1. Alternatively, only the board of the high-voltage power supply unit 120 may be provided on the front surface side, and the board of the low-voltage power supply unit 110 may be provided at another position such as a side surface.

Positioning of Process Unit

Figure 6A:
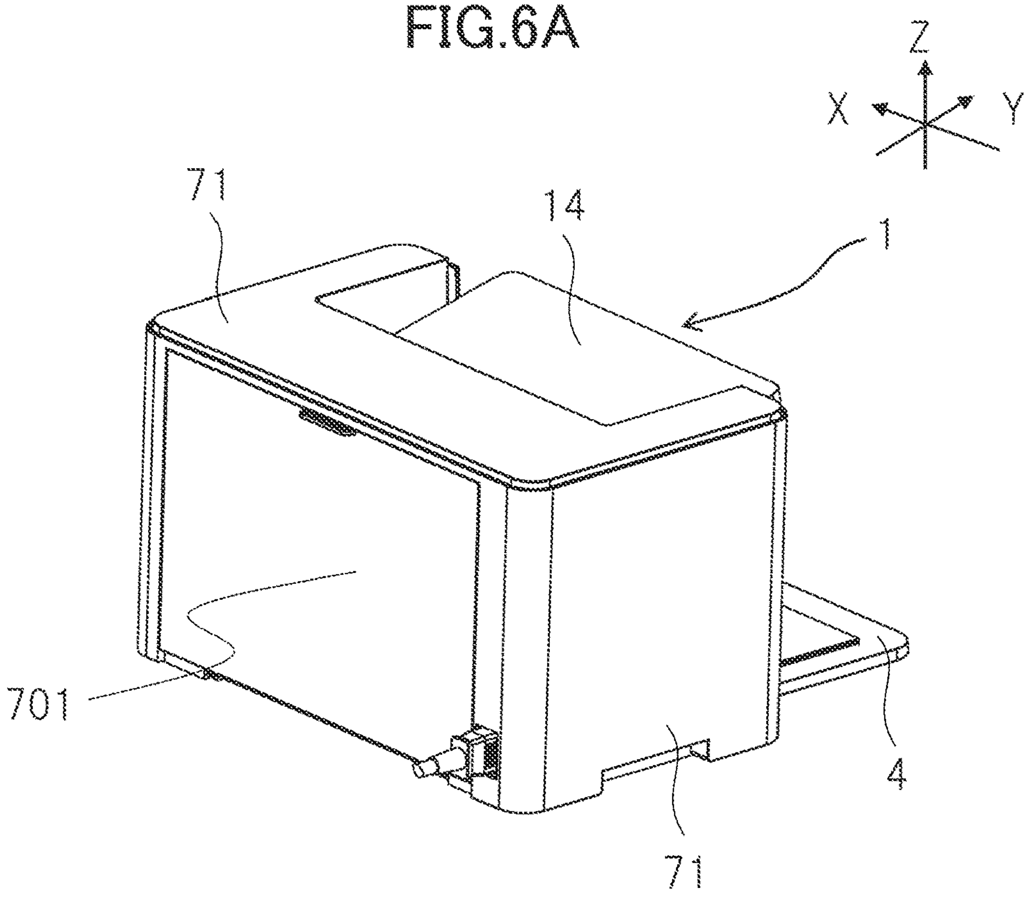
FIG. 6A is a perspective view illustrating a back surface side of the image forming apparatus in a state where a back cover is closed.
Figure 6B:
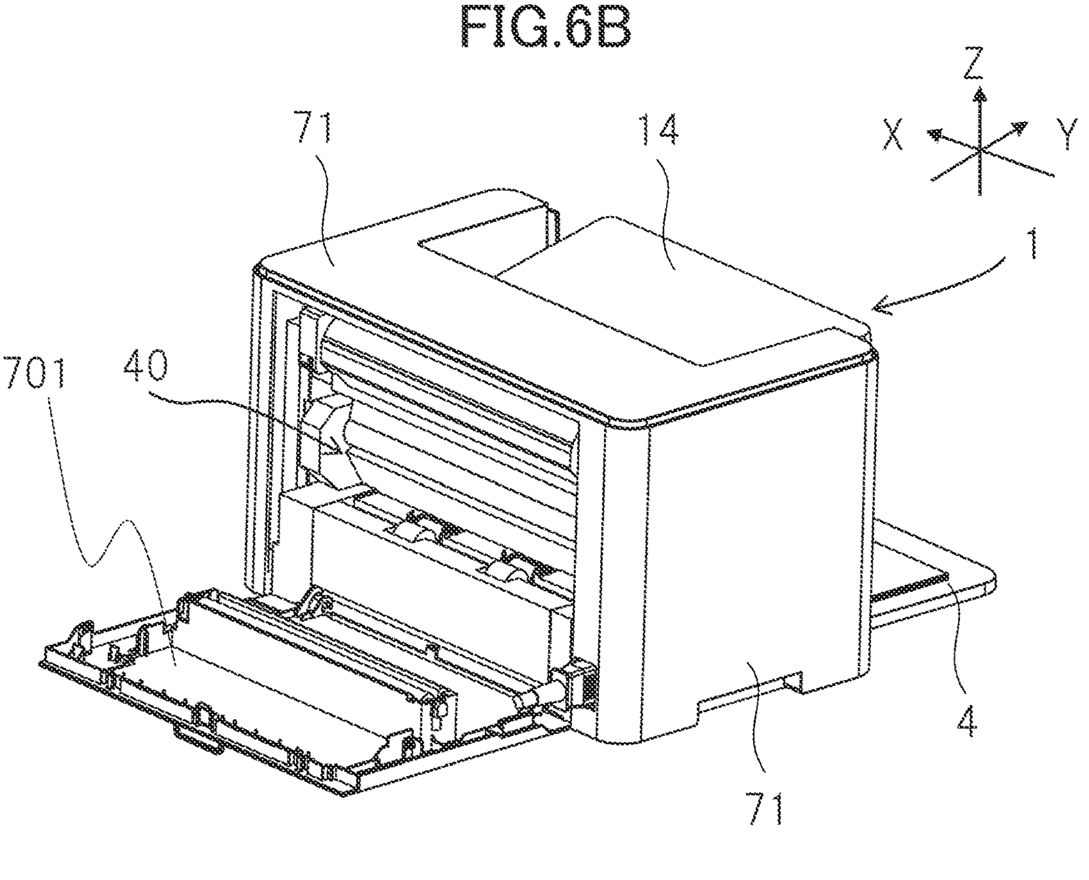
FIG. 6B is a perspective view illustrating the back surface side of the image forming apparatus in a state where the back cover is opened.
Figure 7:
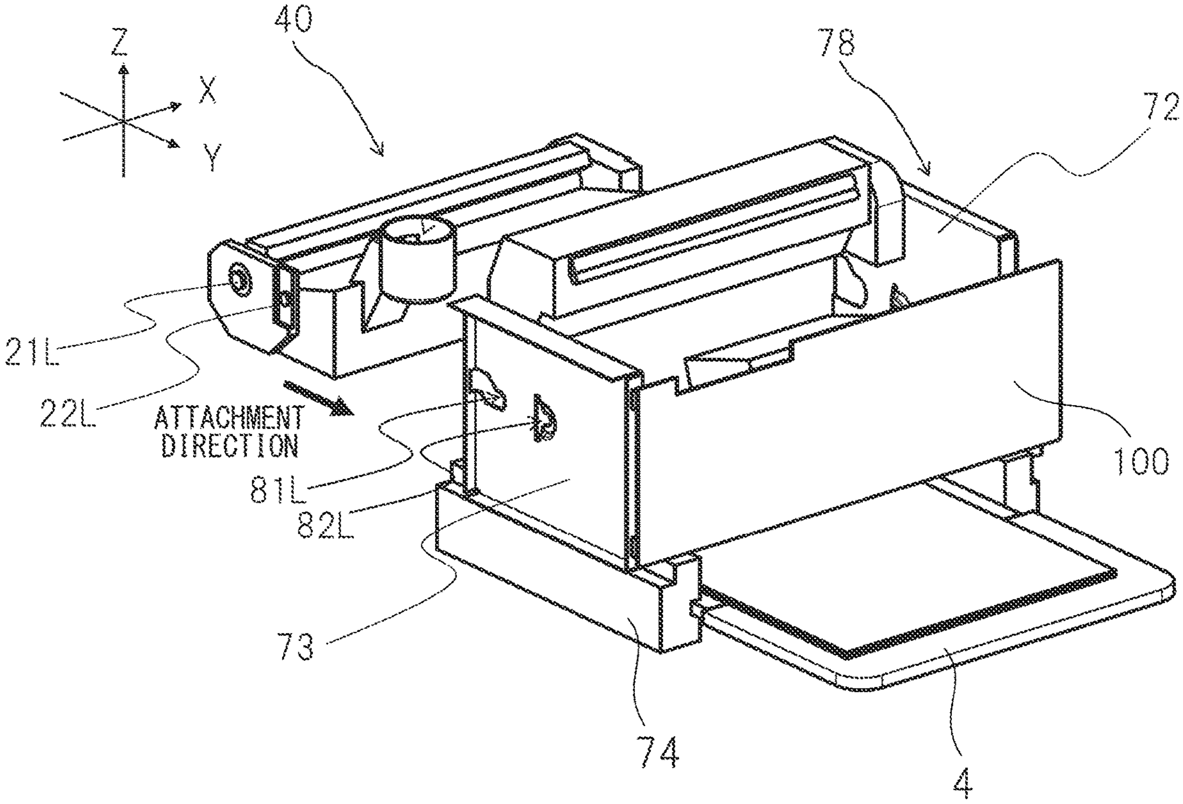
FIG. 7 is a perspective view illustrating a process unit before attachment.
Figure 8:
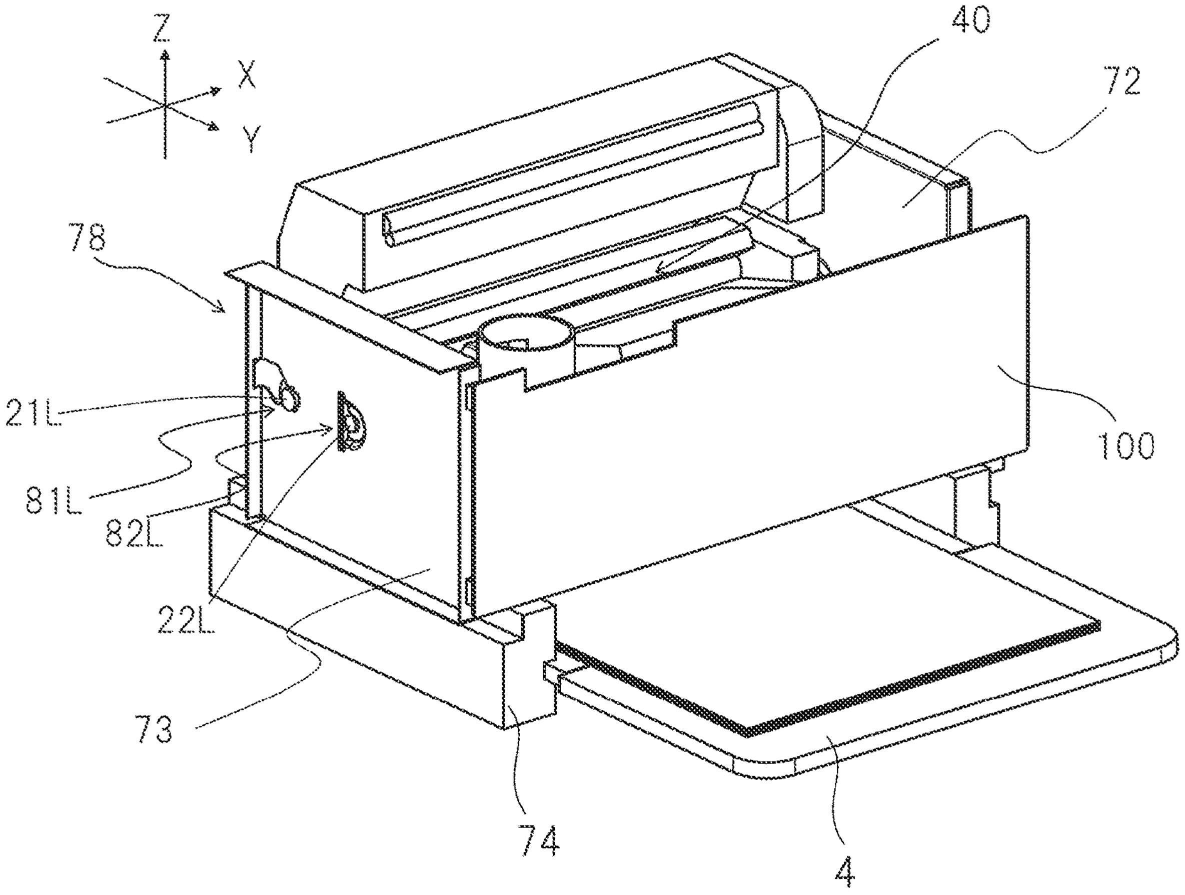
FIG. 8 is a perspective view illustrating a process unit after attachment.
Figure 9:
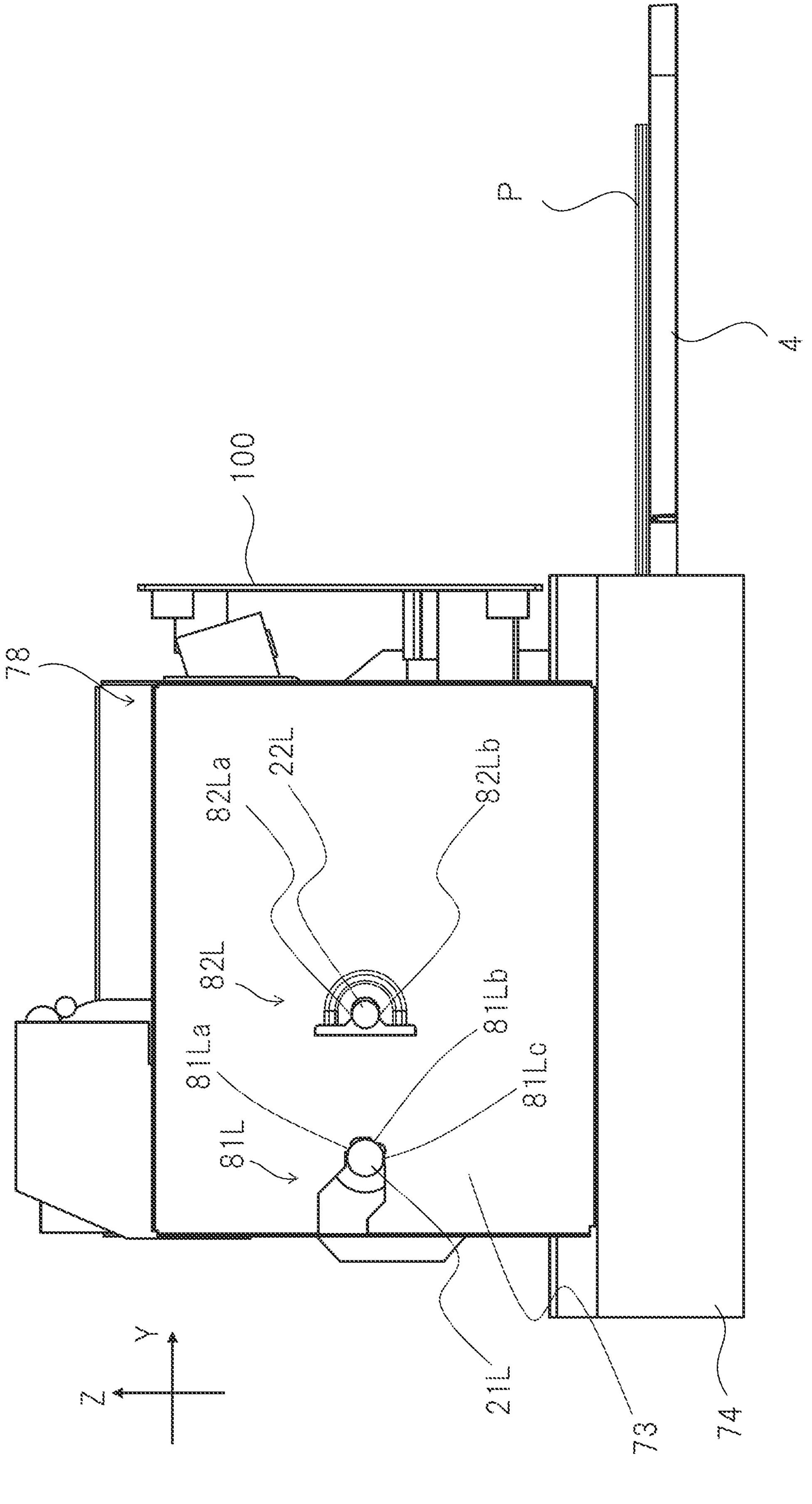
FIG. 9 is a side view illustrating the process unit after attachment.

Next, a positioning configuration of the process unit 40 will be described with reference to FIGS. 6A to 9. FIG. 6A is a perspective view illustrating the back side of the image forming apparatus 1 in a state where the back cover 701 is closed, and FIG. 6B is a perspective view illustrating the back side of the image forming apparatus 1 in a state where the back cover 701 is opened. FIG. 7 is a perspective view illustrating the process unit 40 before attachment, FIG. 8 is a perspective view illustrating the process unit 40 after attachment, and FIG. 9 is a side view illustrating the process unit 40 after attachment.

As illustrated in FIGS. 6A and 6B, the back cover 701 is provided on the back side of the image forming apparatus 1 so as to be openable and closable. When the back cover 701 is in the open state, the process unit 40 can be attached and detached.

As illustrated in FIG. 7, the process unit 40 is attached to the support frame body 78 in an attachment direction (Y direction) from the back side to the front side. A left positioning boss 21L and a left rotation restricting boss 22L are provided on the left surface side of the process unit 40. Similarly, a right positioning boss 21R and a right rotation restricting boss 22R are provided on the right surface side of the process unit 40 (see FIG. 17 described later). In the present exemplary embodiment, the left rotation restricting boss 22L (right rotation restricting boss 22R) is disposed downstream of the left positioning boss 21L (right positioning boss 21R) in the mounting direction.

When the process unit 40 is inserted into the support frame body 78, the process unit is urged from the back surface side toward the front surface side by an urging force of an urging member (not illustrated), thereby being drawn into the support frame body 78. As illustrated in FIGS. 8 and 9, the process unit 40 is drawn into the support frame body 78 until the left positioning boss 21L and the left rotation restricting boss 22L are engaged with the left positioning portion 81L and the left rotation restricting portion 82L of the left-side plate frame 73, respectively. At this time, although not illustrated, the right positioning boss and the right rotation restricting boss of the process unit 40 are engaged with the right positioning portion and the right rotation restricting portion of the right-side plate frame 72, respectively. Thus, the process unit 40 is disposed at a predetermined position in the support frame body 78.

As illustrated in FIG. 9, the left positioning portion 81L has three surfaces of a first surface 81La, a second surface 81Lb, and a third surface 81Lc, and the left rotation restricting portion 82L has two surfaces of a first restricting surface 82La and a second restricting surface 82Lb. The right positioning portion and the right rotation restricting portion (not illustrated) have the same configuration. In the present exemplary embodiment, the centers of the left positioning boss 21L and the left rotation restricting boss 22L are at the same height in the Z direction, but are not necessarily at the same height.

Contact Member of Process Unit

In the present exemplary embodiment, as described above, in the process unit 40, the voltage is supplied to each operation unit of the charge roller 17, the developing roller 12, the transfer roller 7*a*, the discharging device 13, and the developing blade 19 by the high-voltage power supply unit 120 of the circuit board 100. Therefore, the process unit 40 is provided with a contact member for supplying a voltage to each operation unit.

Figure 10:
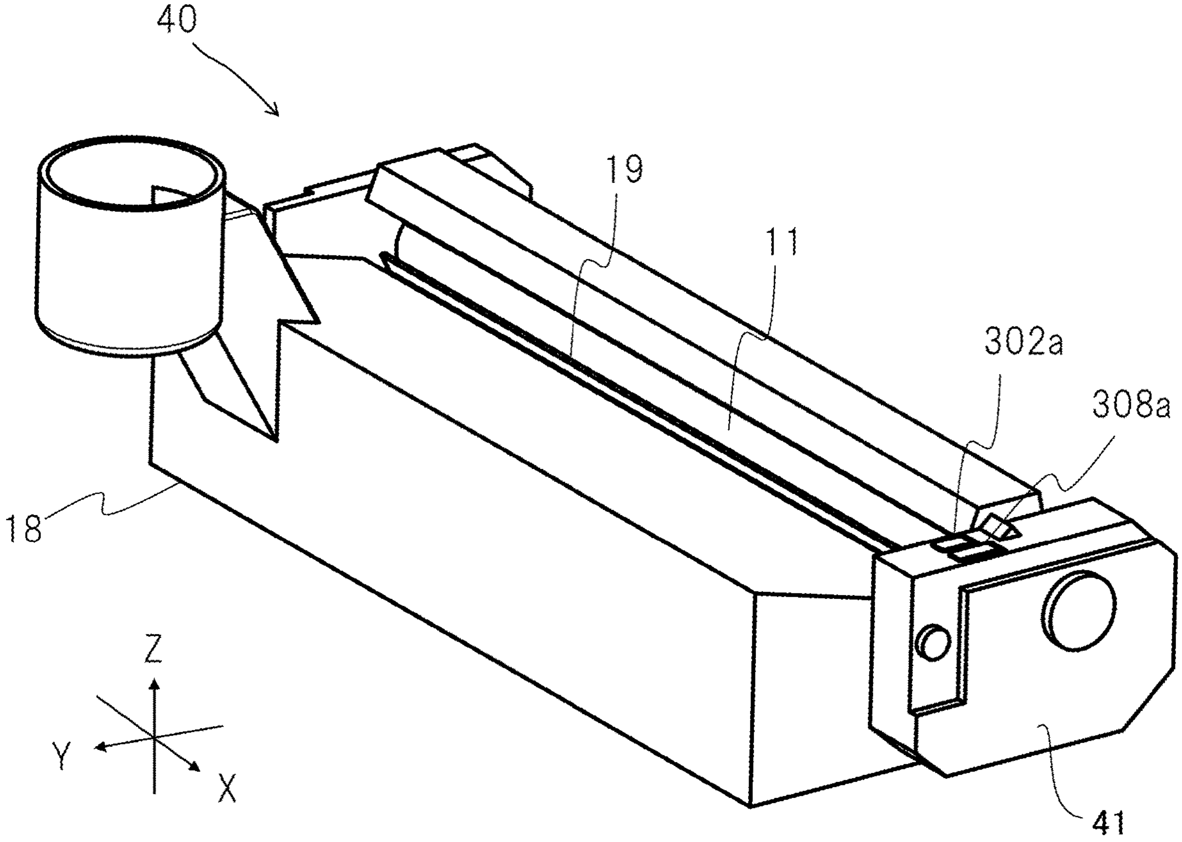
FIG. 10 is a perspective view illustrating a charging contact and a discharging contact of the process unit.
Figure 11:
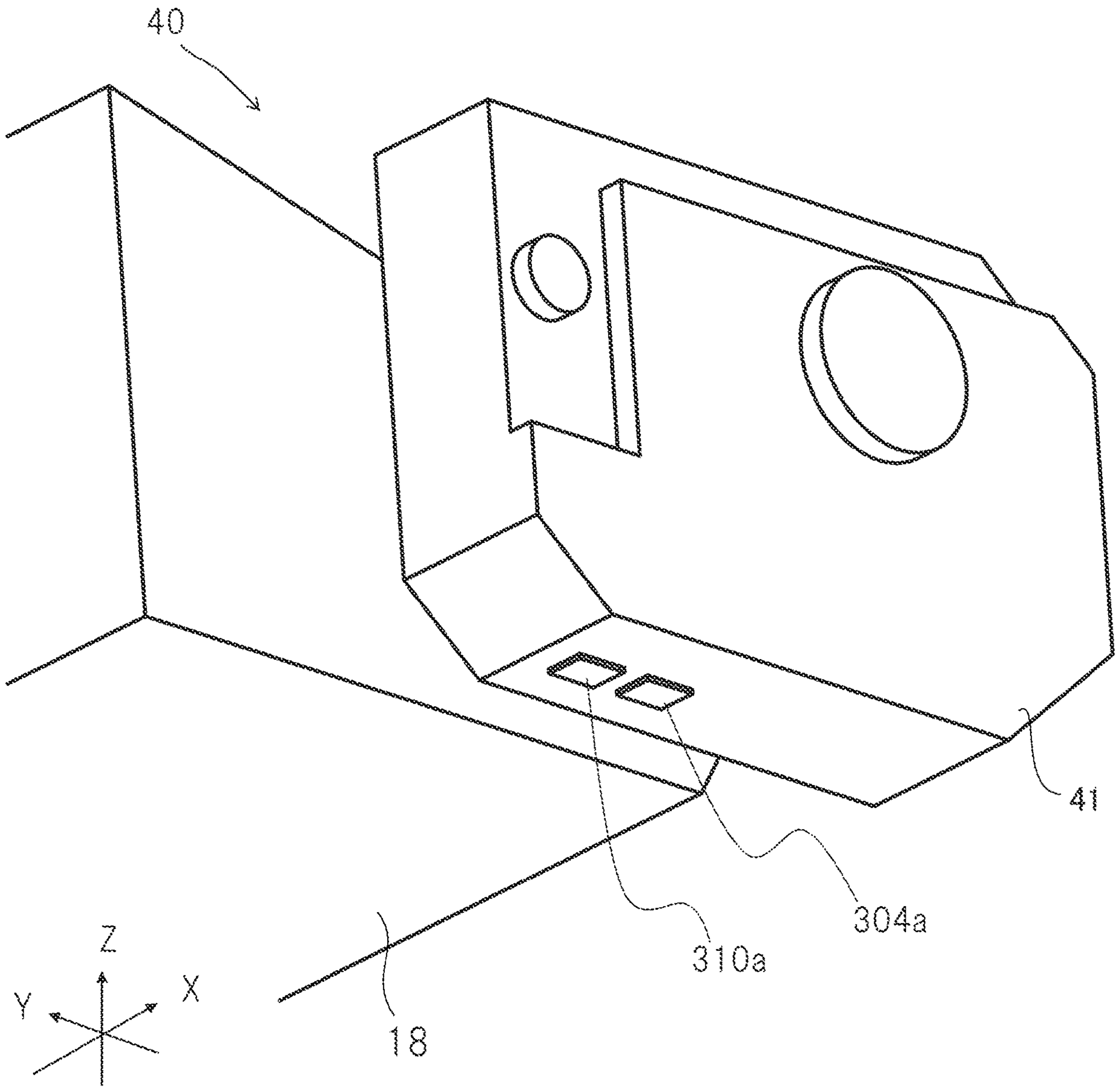
FIG. 11 is a perspective view illustrating a developing contact and a blade contact of the process unit.
Figure 12:
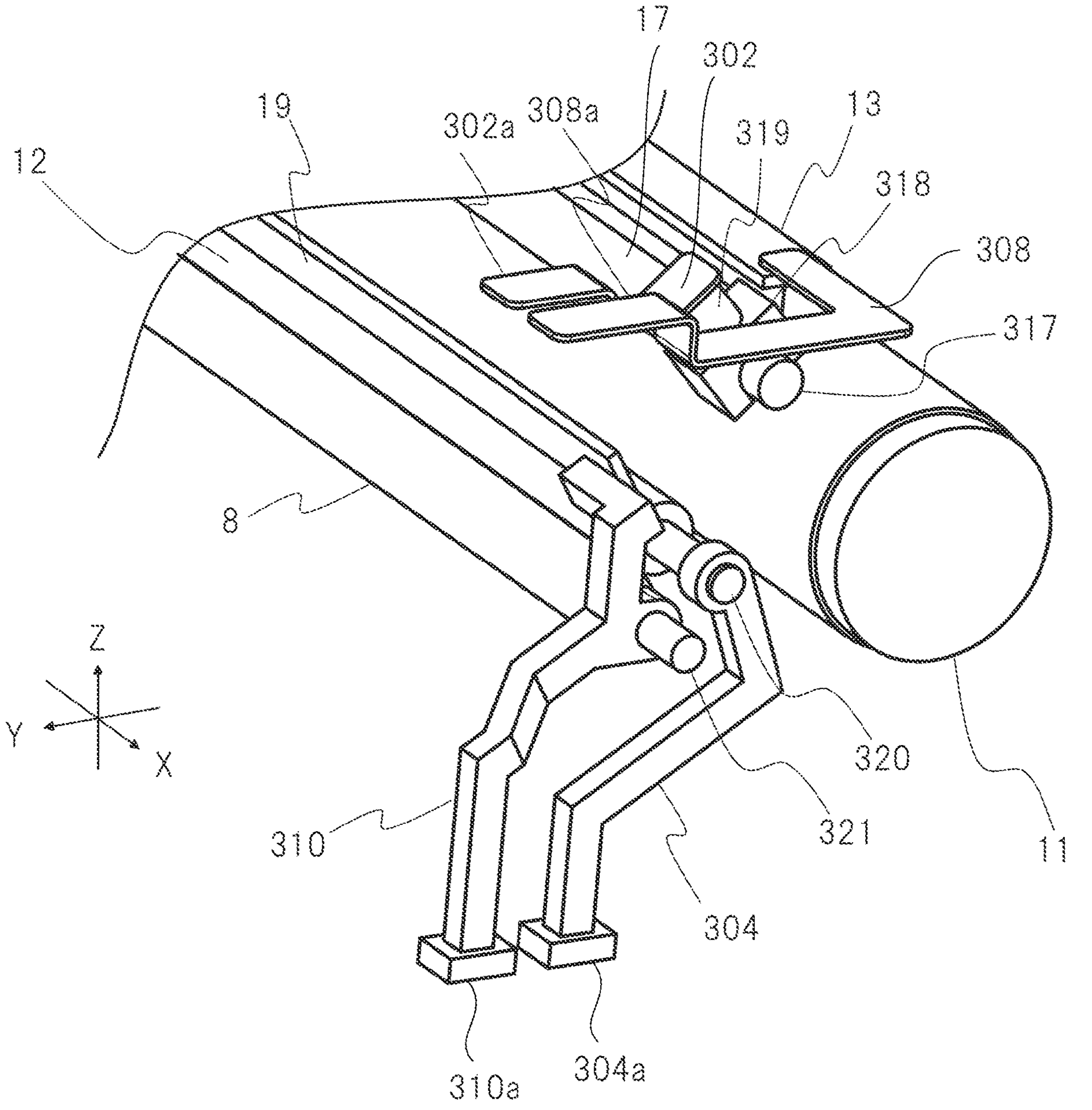
FIG. 12 is a perspective view illustrating a contact member of the process unit.

The contact member of the process unit 40 will be described with reference to FIGS. 10 to 12 while referring to FIG. 2. FIG. 10 is a perspective view illustrating a charging contact and a discharging contact of the process unit 40. FIG. 11 is a perspective view illustrating developing contacts and blade contacts of the process unit 40. FIG. 12 is a perspective view illustrating a contact member of the process unit 40.

As illustrated in FIG. 10, a charging contact 302*a* (contact of the operation unit, first contact) capable of supplying a charging voltage to the charge roller 17 is disposed on the upper surface of the process unit 40 (specifically, the support unit 41) so as to be exposed. On the upper surface of the process unit 40, a discharging contact 308*a* (operation unit contact) that enables supply of a discharging voltage to the discharging device 13 is exposed in parallel to the charging contact 302*a* in the width direction.

On the other hand, as illustrated in FIG. 11, on the lower surface of the process unit 40 (specifically, the support unit 41), a developing contact 304*a* (contact of the operation unit, second contact) that enables supply of a developing voltage to the developing roller 12 is disposed so as to be exposed. On the lower surface of the process unit 40, a blade contact 310*a* (contact of the operation unit) that enables supply of a developing blade voltage to the developing blade 19 and enables supply of a toner supply voltage to the supply roller 8 is exposed in parallel to the developing contact 304*a* in the discharge direction (Y direction).

As illustrated in FIG. 12, the process unit 40 includes, as contact members, a charging contact member 302 having a charging contact 302*a*, and a discharging contact member 308 having a discharging contact 308*a*. The charging contact member 302 and the discharging contact member 308 are formed in a plate shape using a metal material such as a conductive stainless material, and a voltage is supplied through the charging contact 302*a* and the discharging contact 308*a* exposed on the upper surface of the process unit 40. A side of the discharging contact member 308 opposite to the discharging contact 308*a* is connected to the discharging device 13, and the voltage supplied to the discharging contact member 308 is applied to the discharging device 13.

On the other hand, a side of the charging contact member 302 opposite to the charging contact 302*a* is connected to the charging urging member 319, the charge roller bearing 318, and the charge roller shaft 317, and the voltage supplied to the charging contact member 302 is applied to the charge roller 17. The charge roller shaft 317 of the charge roller 17 is made of a metal material such as a conductive stainless material. A charge roller bearing 318 that rotatably supports a charge roller shaft 317 is formed of a conductive resin member. Further, the charging urging member 319 is an urging member formed of, for example, a conductive compression spring, and urges the charge roller bearing 318 toward the charge roller shaft 317. Therefore, the voltage supplied to the charging contact member 302 is applied to the charge roller 17 via the charging urging member 319, the charge roller bearing 318, and the charge roller shaft 317.

In addition, the process unit 40 includes, as contact members, a developing contact member 304 having a developing contact 304*a* and a blade contact member 310 having a blade contact 310*a*. The developing contact member 304 and the blade contact member 310 are made of a conductive resin member.

The voltage is supplied to the developing contact member 304 through a developing contact 304*a* exposed on the lower surface of the process unit 40. An end of the developing contact member 304 on a side opposite to the developing contact 304*a* is used as a bearing of a developing roller shaft 320 formed of a metal material such as a conductive stainless material, and rotatably holds the developing roller 12. Therefore, the voltage supplied to the developing contact member 304 is applied to the developing roller 12 via the developing roller shaft 320.

The blade contact member 310 is bifurcated in the middle, and one of the branches is used as a bearing of a supply roller shaft 321 formed of a metal material such as a conductive stainless material, and rotatably holds the supply roller 8. The other of the two branches is connected to the developing blade 19. Therefore, the voltage supplied to the blade contact member 310 is supplied to the supply roller 8 via the supply roller shaft 321 and is also supplied to the developing blade 19.

Next, a high-voltage contact unit that electrically connects each contact of the contact member of the process unit 40 and each contact of the circuit contact portion 300 (see FIG. 4) will be described with reference to FIGS. 2, 4, and 12 and FIGS. 13 to 18.

Figure 13:
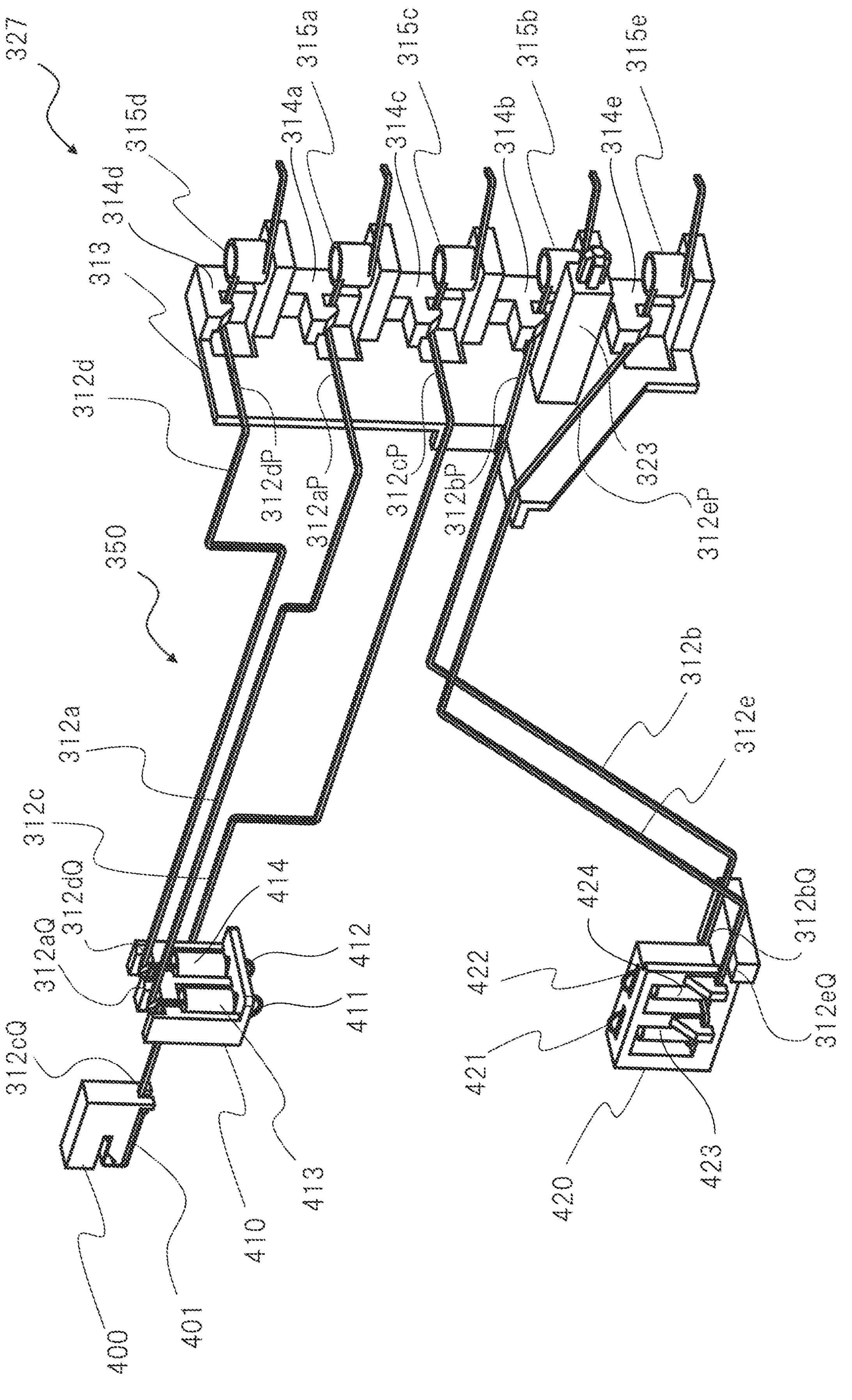
FIG. 13 is a schematic view illustrating a high-voltage contact unit according to a first exemplary embodiment.

As illustrated in FIG. 13, the high-voltage contact unit 350 of the present exemplary embodiment includes a board contact unit 327 as a first holding unit, and a first cable holding unit 400, a second cable holding unit 410, and a third cable holding unit 420 as a second holding unit. The first cable holding unit 400, the second cable holding unit 410, and the third cable holding unit 420 are configured separately from the board contact unit 327. The high-voltage contact unit 350 also includes high-voltage cables 312*a* to 312*e* that electrically connect the board contact unit 327 and the cable holding units 400, 410, and 420. The high-voltage cables 312*a* to 312*e* are conductive signal lines formed of, for example, metal wire members, and are formed to have a wire diameter that bends when receiving a load, for example, a diameter of "0.5 mm or more and 0.7 mm or less". In the present disclosure, the high-voltage cable is not limited to one signal line, and includes a bundle of a plurality of signal lines.

Board Contact Unit

The board contact unit 327 conducts the board contacts (301, 303, 305, 307, 309) of the circuit board 100 and the plurality of high-voltage cables 312*a* to 312*e*, respectively. To do so, the board contact unit 327 includes a plurality of holding portions 314*a* to 314*e* that hold first ends of the plurality of high-voltage cables 312*a* to 312*e*, respectively, and one support plate 313 that supports the holding portions 314*a* to 314*e*. The holding portions 314*a* to 314*e* are integrally formed with the support plate 313. Since the board contact unit 327 holds first ends of the high-voltage cables 312*a* to 312*e* to which a high voltage is applied, the board contact unit is formed of a flame-retardant member.

In the present exemplary embodiment, the first holding portion 314*a* holds a first end 312*a*P of the charging high-voltage cable 312*a* that is electrically connected to the charging contact 302*a* of the charge roller 17 to supply a charging voltage. The second holding portion 314*b* holds a first end 312*b*P of a development high-voltage cable 312*b* that is electrically connected to the developing contact 304*a* of the developing roller 12 to supply a developing voltage. The third holding portion 314*c* holds a first end 312*c*P of a transfer high-voltage cable 312*c* that is electrically connected to the transfer contact 306*a* (contact of the operation unit, see FIG. 16) of the transfer roller 7*a* to supply a transfer voltage. The fourth holding portion 314*d* holds a first end 312*d*P of a discharging high-voltage cable 312*d* that is electrically connected to the discharging contact 308*a* of the discharging device 13 to supply a discharging voltage. The fifth holding portion 315*e* holds a first end 312*e*P of the blade high-voltage cable 312*e* that is electrically connected to the blade contact 310*a* of the developing blade 19 and supplies a blade voltage.

On the other hand, the first cable holding unit 400 holds the second end 312*c*Q of the transfer high-voltage cable 312*c*. The second cable holding unit 410 holds the second end 312*a*Q of the charging high-voltage cable 312*a* and the second end 312*d*Q of the discharging high-voltage cable 312*d*. The third cable holding unit 420 holds the second end 312*b*Q of the development high-voltage cable 312*b* and the second end 312*e*Q of the blade high-voltage cable 312*e*. These cable holding units 400, 410, and 420 are mainly formed of a flame-retardant member.

In the high-voltage contact unit 350 of the present exemplary embodiment, the first cable holding unit 400, the second cable holding unit 410, and the third cable holding unit 420 are provided separately from the board contact unit 327. That is, the first cable holding unit 400, the second cable holding unit 410, and the third cable holding unit 420 are not integrally formed with the support plate 313 of the board contact unit 327 unlike the holding portions 314*a* to 314*e*. As described above, a first end (first end) of each of the high-voltage cables (312*a* to 312*e*) as a wire is held by the support plate 313 via the holding portions (314*a* to 314*e*), and the second end (second end) is held by any one of the first cable holding unit 400, the second cable holding unit 410, and the third cable holding unit 420. The central portion other than the first end and the second end is not held by the support plate 313 or any of the first cable holding unit 400, the second cable holding unit 410, and the third cable holding unit 420. That is, the central portion of each of the high-voltage cables (312*a* to 312*e*) is floating in the air. In the present exemplary embodiment, a first end (first end) of the high-voltage cable refers to a first end side from a position in contact with the support plate 313 of the board contact unit 327, and the second end (second end) of the high-voltage cable refers to the second end side from a position in contact with any one of the first cable holding unit 400, the second cable holding unit 410, and the third cable holding unit 420.

Figure 14:
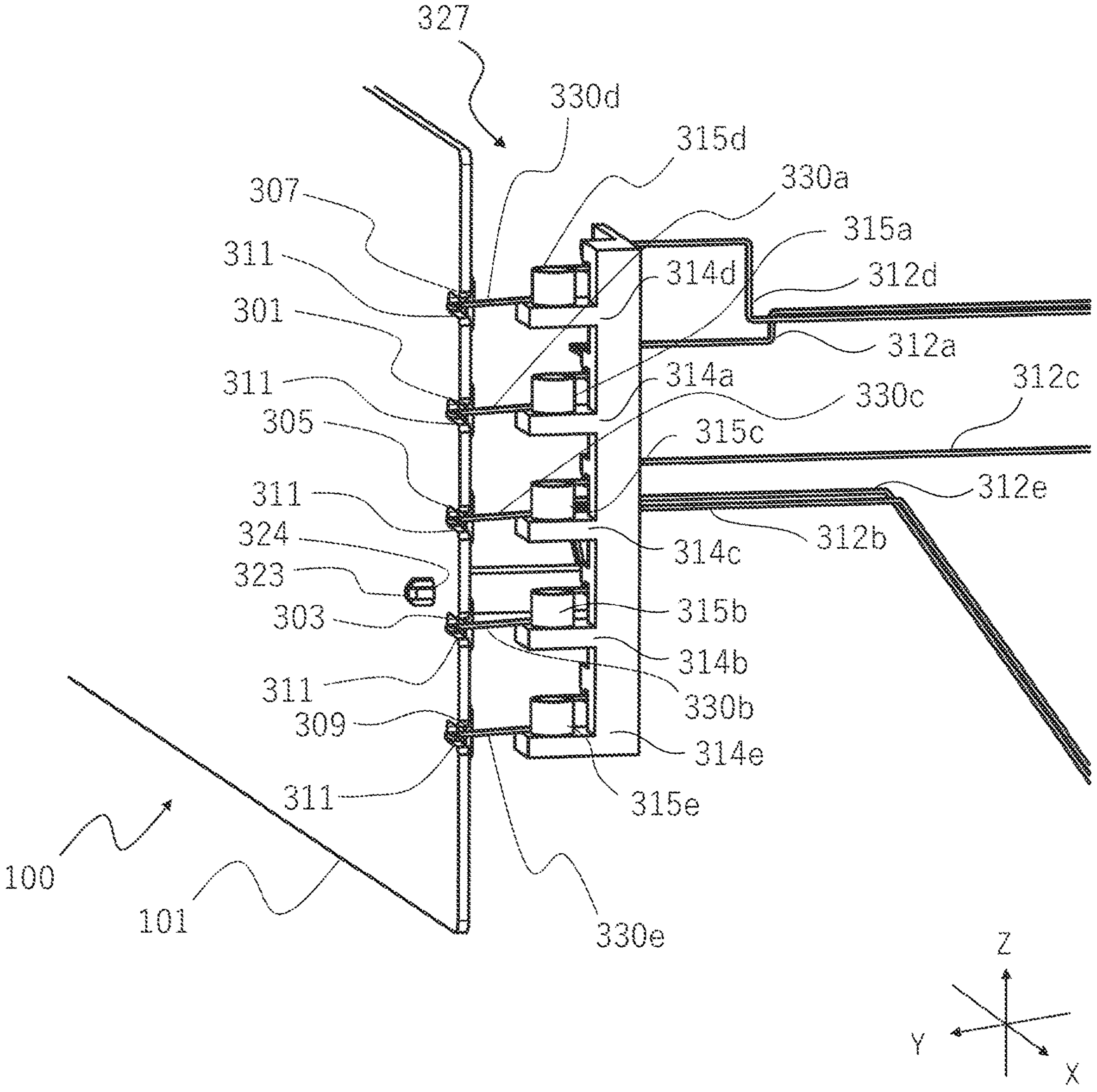
FIG. 14 is a schematic view illustrating a board contact unit.

As illustrated in FIG. 14, each of the holding portions (314*a* to 314*e*) has a torsion coil spring (315*a* to 315*e*) as a board urging portion. In the present exemplary embodiment, the torsion coil springs (315*a* to 315*e*) are formed integrally with the high-voltage cables (312*a* to 312*e*). Ends of the torsion coil springs (315*a* to 315*e*) on a side opposite to the second ends (312*a*Q, 312*b*Q, 312*c*Q, 312*d*Q, 312*e*Q) are in contact with the respective board contacts (301, 303, 305, 307, 309), serving as contacts of the voltage control board, to form board contact portions (330*a* to 330*e*) which make the circuit board 100 and the high-voltage cables (312*a* to 312*e*) conductive with each other. That is, the board contact portions (330*a* to 330*e*), serving as a first contact portion respectively, are electrically connected to first ends (312*a*P, 312*b*P, 3120, 312*d*P, 312*e*P) of the high-voltage cables (312*a* to 312*e*). The torsion coil springs (315*a* to 315*e*) may be formed separately from the high-voltage cables (312*a* to 312*e*). For example, a first end side of the torsion coil spring (315*a* to 315*e*) may be connected to the high-voltage cable (312*a* to 312*e*), and the second end side may be in contact with each board contact (301, 303, 305, 307, 309) of the circuit board 100. In this case, on the second end side of the torsion coil springs (315*a* to 315*e*), board contact portions (330*a* to 330*e*) which are brought into contact with the respective board contacts (301, 303, 305, 307, 309) to conduct the circuit board 100 and the high-voltage cables (312*a* to 312*e*) are formed.

The torsion coil springs (315*a* to 315*e*) urge the board contact portions (330*a* to 330*e*) toward the respective board contacts (301, 303, 305, 307, 309). Specifically, the first torsion coil spring 315*a* urges the first board contact portion 330*a* toward the charging board contact 301, and the second torsion coil spring 315*b* urges the second board contact portion 330*b* toward the developing board contact 303. The third torsion coil spring 315*c* urges the third board contact portion 330*c* toward the transfer board contact 305, and the fourth torsion coil spring 315*d* urges the fourth board contact portion 330*d* toward the discharging board contact 307. The fifth torsion coil spring 315*e* urges the fifth board contact portion 330*e* toward the blade board contact 309.

The board contact portions (330*a* to 330*e*) enter the slits 311 of the circuit board 100, and press the charging board contacts 301, the developing board contacts 303, the transfer board contacts 305, the discharging board contacts 307, and the blade board contacts 309 with a predetermined urging force, respectively. Thus, the high-voltage cables (312*a* to 312*e*) connected to a first end side of the torsion coil springs (315*a* to 315*e*) and the board contacts (301, 303, 305, 307, 309) can be reliably electrically connected to each other.

Figure 15:
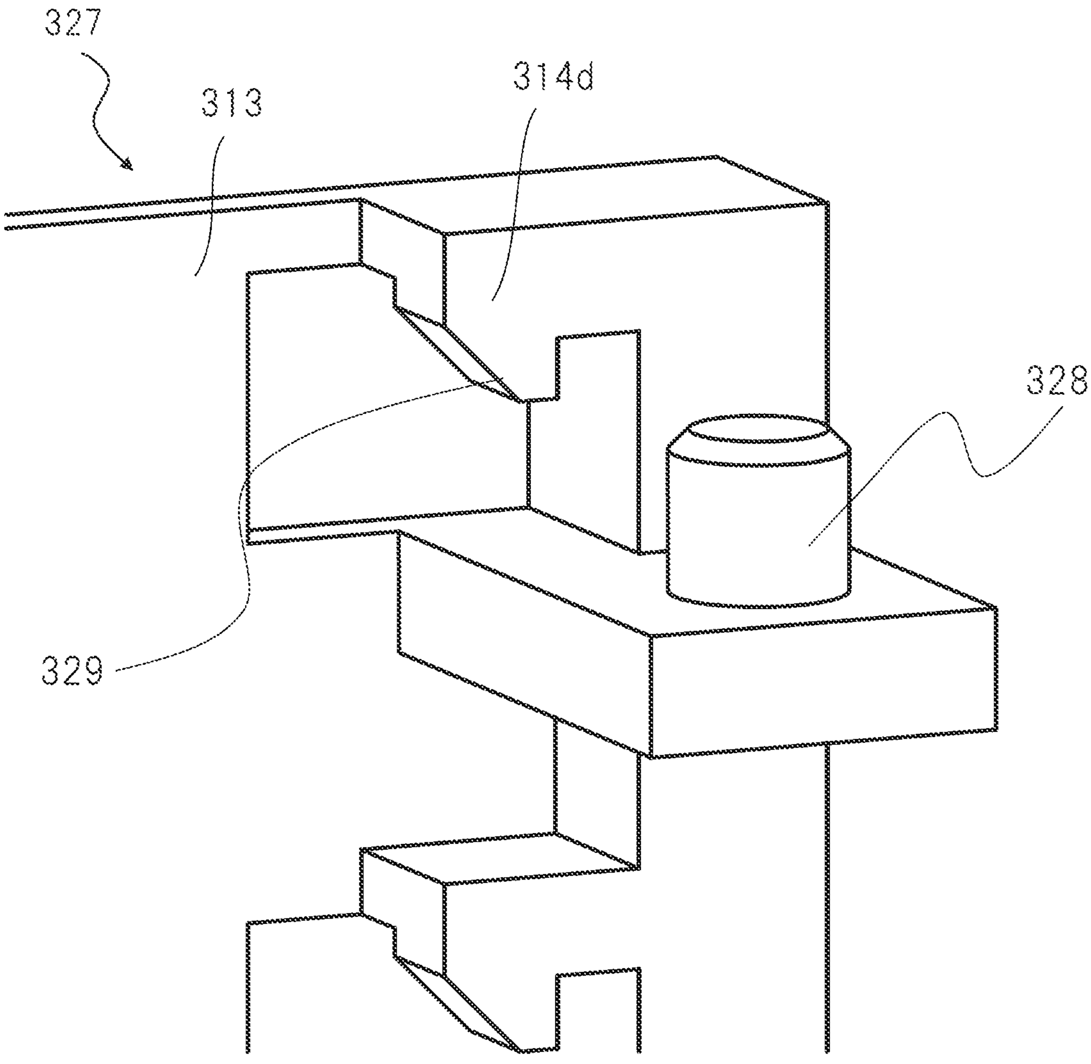
FIG. 15 is an enlarged view illustrating a cable holding portion.

As illustrated in FIG. 15, the fourth holding portion 314*d* is provided with a boss 328 and a claw 329. The boss 328 holds the coil portion of the fourth torsion coil spring 315*d* described above. In order to prevent the coil portion from being detached from the boss 328 while receiving the urging force of the fourth torsion coil spring 315*d*, the claw 329 is provided as a stopper. The fourth board contact portion 330*d* formed in the fourth torsion coil spring 315*d* is locked to the claw 329. The holding portions (314*a*, 314*b*, 314*c*, 314*e*) other than the fourth holding portion 314*d* have the same configuration as that of the fourth holding portion 314*d*, and thus description thereof is omitted here.

Returning to FIG. 14, the board contact unit 327 includes an alignment portion 323 that positions the board contact unit 327 with respect to the circuit board 100 in a state where the board contact portions (330*a* to 330*e*) are in contact with the board contacts (301, 303, 305, 307, 309). When the alignment portion 323 is engaged with the engagement hole 324 provided in the circuit board 100, the board contact unit 327 is positioned with respect to the circuit board 100 at a position where the board contact portions (330*a* to 330*e*) are in contact with the board contacts (301, 303, 305, 307, 309) of the circuit board 100.

Cable Holding Unit

Figure 16:
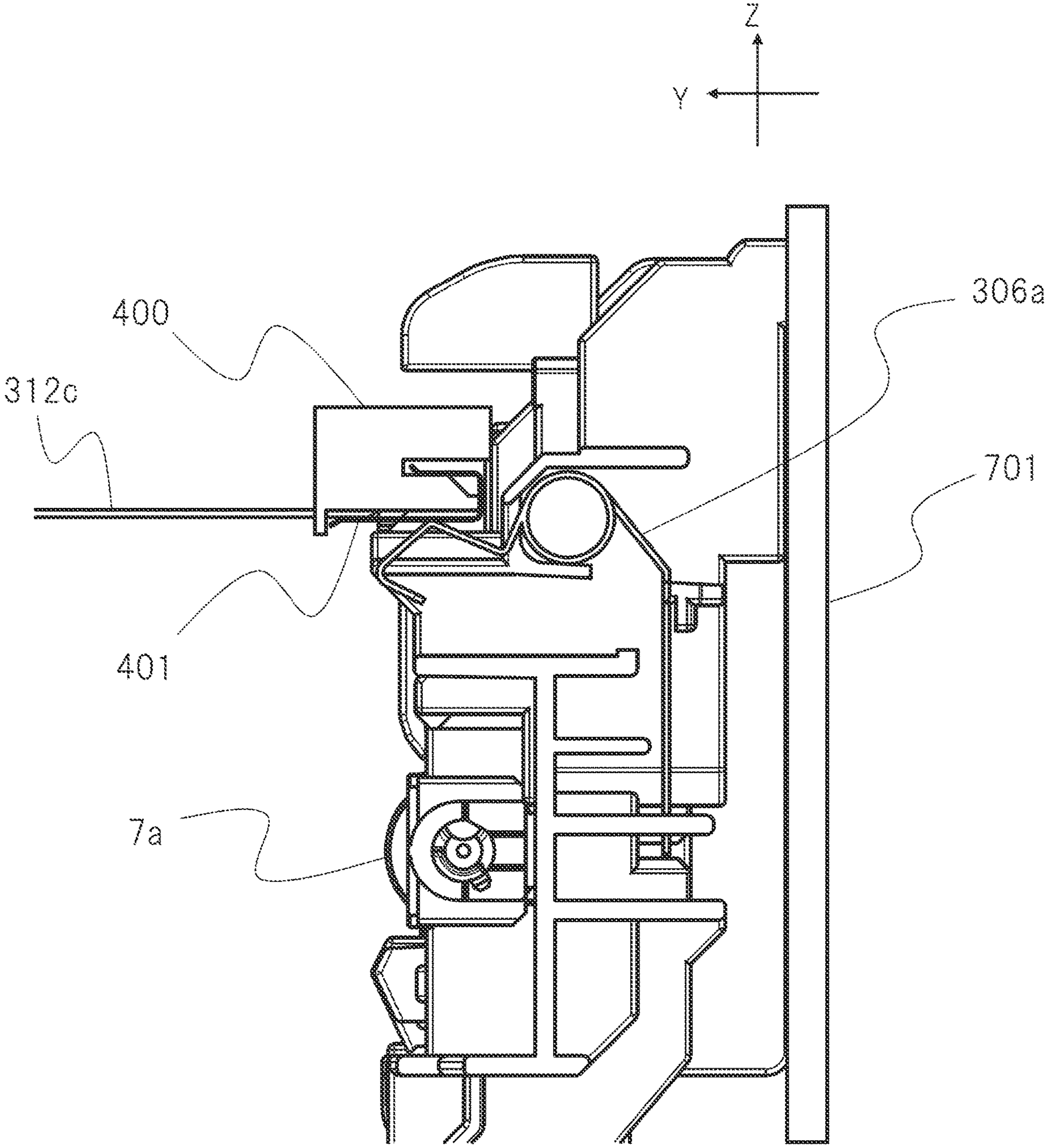
FIG. 16 is a side view illustrating a first cable holding unit.

Next, the first cable holding unit 400 will be described with reference to FIG. 16. As illustrated in FIG. 16, the first cable holding unit 400 holds the second end of the transfer high-voltage cable 312*c* and is disposed above the transfer roller 7*a*. The first cable holding unit 400 has a transfer contact plate 401 connected to the transfer high-voltage cable 312*c* on the transfer roller 7*a* side. The transfer contact plate 401 is a metal plate, and is in contact with the transfer contact 306*a* of the transfer roller 7*a*. When the transfer contact plate 401 and the transfer contact 306*a* come into contact with each other, the transfer high-voltage cable 312*c* and the transfer roller 7*a* are electrically connected to each other. The transfer contact 306*a* may be, for example, a plate-shaped spring in which a sheet metal is bent to have elasticity, and is elastically deformed to come into contact with the transfer contact plate 401, thereby being reliably in contact with the transfer contact plate 401. Note that the transfer contact 306*a* may be provided on the back cover 701 so as to be movable to a contact position in contact with the transfer roller 7*a* and a separation position away from the transfer roller 7*a* according to opening and closing of the back cover 701.

Figure 17:
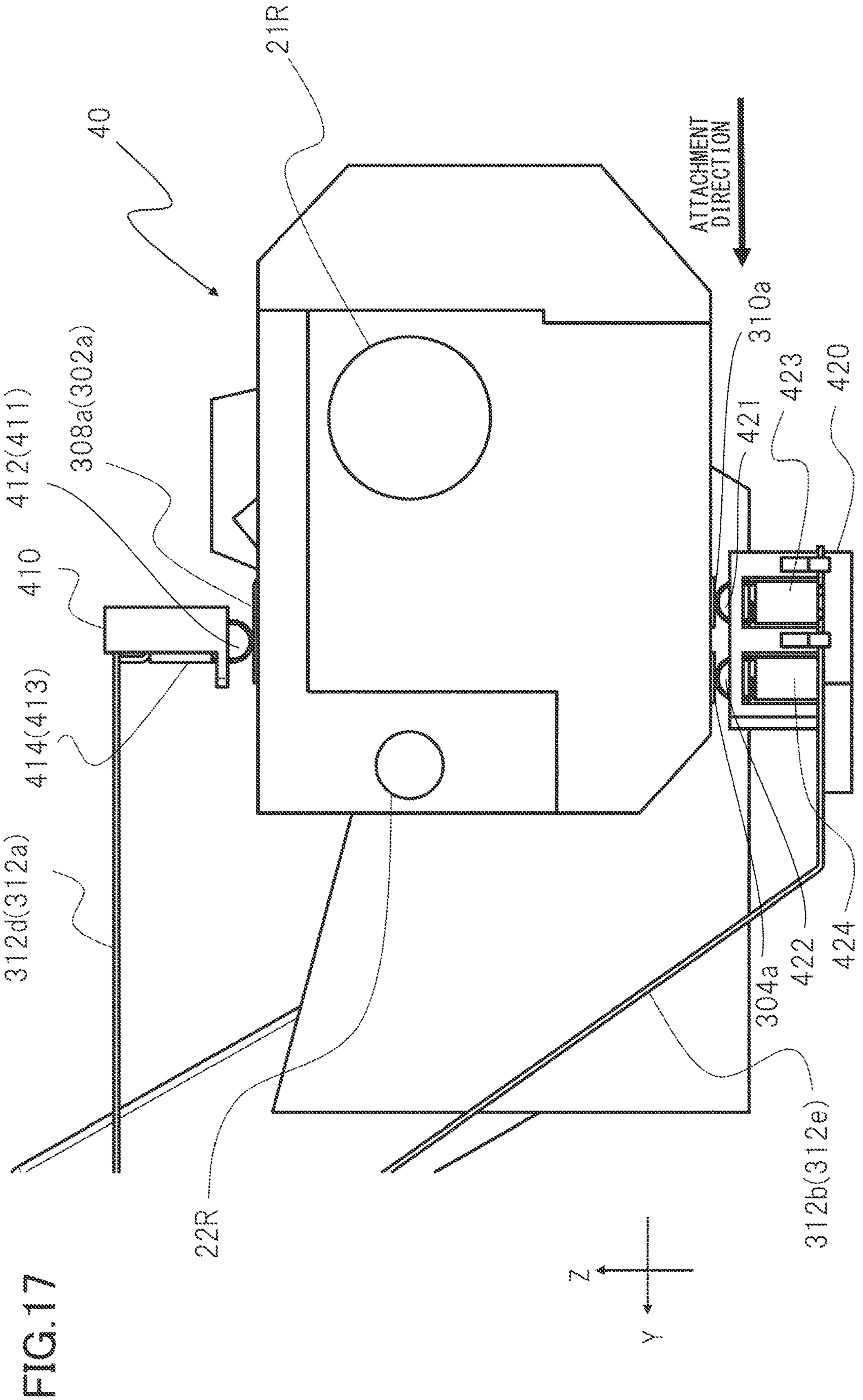
FIG. 17 is a side view illustrating a second cable holding unit and a third cable holding unit.
Figure 18:
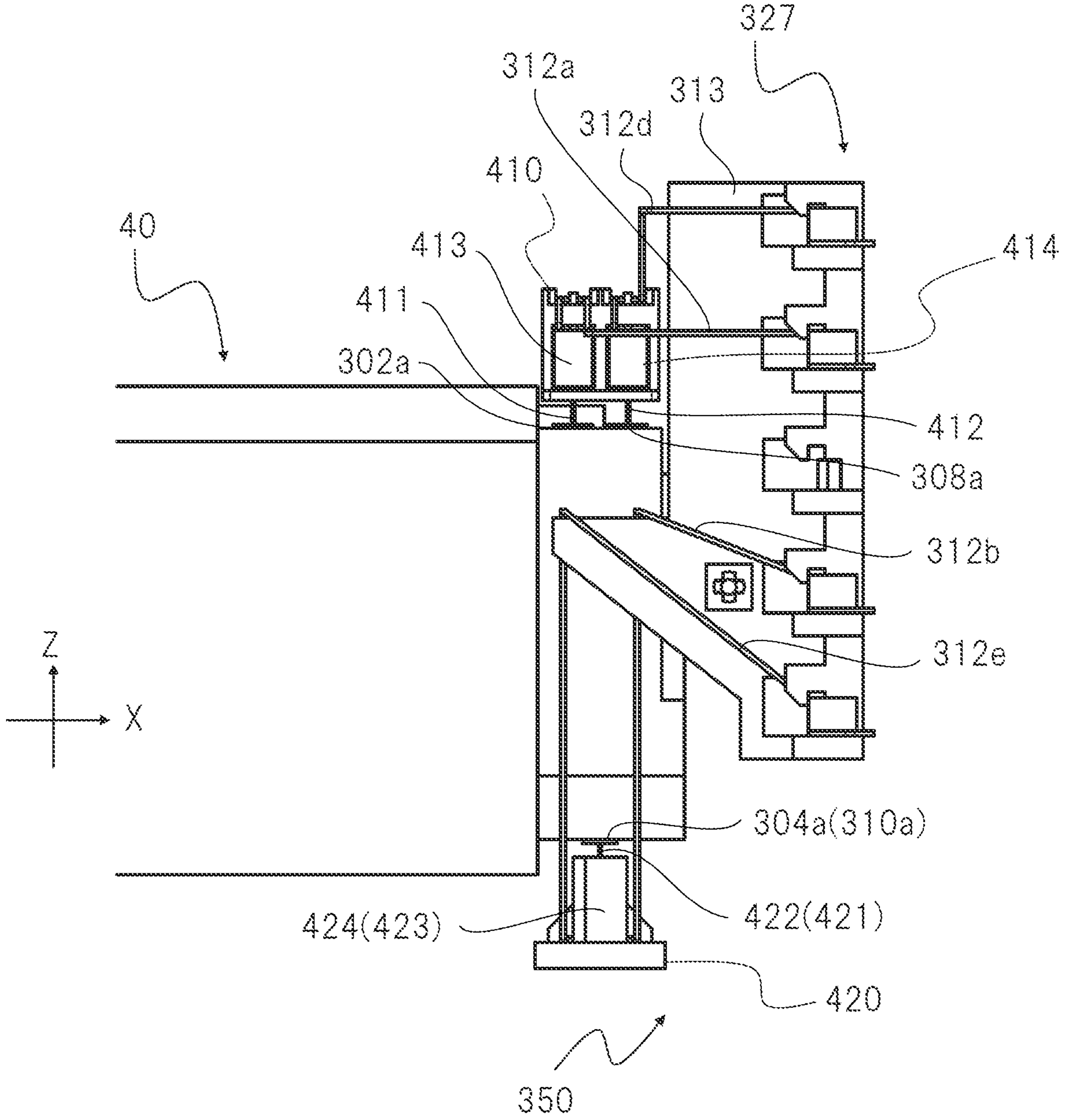
FIG. 18 is a front view illustrating the high-voltage contact unit.

Next, the second cable holding unit 410 and the third cable holding unit 420 will be described with reference to FIGS. 13 and 17 18. As illustrated in FIGS. 17 and 18, the second cable holding unit 410 holds the charging high-voltage cable 312*a* and the discharging high-voltage cable 312*d*. The second cable holding unit 410 includes a charging contact portion 411 (second contact portion) that comes into contact with the charging contact 302*a* of the process unit 40 and is electrically connected to the second end 312*a*Q of the charging high-voltage cable 312*a*, and a charging urging portion 413 (second urging portion) that urges the charging contact portion 411 toward the charging contact 302*a*. In addition, the second cable holding unit 410 includes a discharging contact portion 412 that is in contact with the discharging contact 308*a* of the process unit 40 and is electrically connected to the second end 312*d*Q of the discharging high-voltage cable 312*d*, and a discharging urging portion 414 that urges the discharging contact portion 412 toward the discharging contact 308*a*.

On the other hand, the third cable holding unit 420 holds the development high-voltage cable 312*b* and the blade high-voltage cable 312*e*. The third cable holding unit 420 includes a developing contact portion 422 that is in contact with the developing contact 304*a* of the process unit 40 and is electrically connected to the second end 312*b*Q of the development high-voltage cable 312*b*, and a development urging portion 424 that urges the developing contact portion 422 toward the developing contact 304*a*. The third cable holding unit 420 includes a blade contact portion 421 that is in contact with the blade contact 310*a* of the process unit 40 and is electrically connected to the second end 312*e*Q of the blade high-voltage cable 312*e*, and a blade urging portion 423 that urges the blade contact portion 421 toward the blade contact 310*a*.

The charging urging portion 413, the discharging urging portion 414, the development urging portion 424, and the blade urging portion 423 are formed of a compression spring. A charging contact portion 411, a discharging contact portion 412, a developing contact portion 422, and a blade contact portion 421 formed in an arc shape are provided at the tip of the compression spring. Note that the charging urging portion 413, the discharging urging portion 414, the development urging portion 424, and the blade urging portion 423, and the charging contact portion 411, the discharging contact portion 412, the developing contact portion 422, and the blade contact portion 421 may be formed separately or integrally. Further, the charging urging portion 413, the discharging urging portion 414, the development urging portion 424, and the blade urging portion 423 are not limited to the compression spring, and may have any shape or material as long as they have elasticity and conductivity.

The second cable holding unit 410 is disposed so as to pressurize the charging contact 302*a* and the discharging contact 308*a* of the process unit 40 from the upper side (the plus side in the Z direction) by the charging urging portion 413 and the discharging urging portion 414. On the other hand, the third cable holding unit 420 is disposed so as to pressurize the developing contact 304*a* and the blade contact 310*a* of the process unit 40 from the lower side (the minus side in the Z direction) by the development urging portion 424 and the blade urging portion 423. The second cable holding unit 410 and the third cable holding unit 420 pressurize the process unit 40 with the same degree of pressurization at substantially opposing positions with the process unit 40 interposed therebetween in the Z direction.

The process unit 40 is detachably provided with respect to the support frame body 78 (see FIG. 7), and as illustrated in FIG. 17, the process unit 40 includes the right positioning boss 21R for positioning with respect to the support frame body 78 and the right rotation restricting boss 22R for restricting rotation. In the mounting direction (Y direction) of the process unit 40, the positioning boss 21R is disposed upstream of the center, and the right rotation restricting boss 22R is disposed downstream of the center. The substantially opposing position is between the positioning boss 21R and the right rotation restricting boss 22R in the Y direction. As illustrated in FIG. 18, also in the X direction, the position where the second cable holding unit 410 pressurizes from the upper side (the plus side in the Z direction) and the position where the third cable holding unit 420 pressurizes from the lower side (the minus side in the Z direction) are substantially opposite to each other.

In this way, the pressure applied to the process unit 40 acts so that the force is balanced from a direction substantially orthogonal to the attaching and detaching direction. Therefore, when the process unit 40 is attached and detached, frictional resistance generated by sliding of the right positioning boss 21R and the right rotation restricting boss 22R on the right positioning portion and the right rotation restricting portion (not illustrated) of the right-side plate frame 72 is reduced. Further, when the process unit 40 is attached and detached, frictional resistance generated by sliding the left positioning boss 21L and the left rotation restricting boss 22L on the left positioning portion 81L and the left rotation restricting portion 82L (see FIG. 9) of the left-side plate frame 73 is reduced. Therefore, the process unit 40 is easily attached to and detached from the support frame body 78.

High-Voltage Cable

Next, the high-voltage cables (312*a* to 312*e*) will be described with reference to FIG. 19. Since the high-voltage cables (312*a* to 312*e*) used in the present exemplary embodiment have the same configuration, the development high-voltage cable 312*b* will be described below as a representative example.

Figure 19:
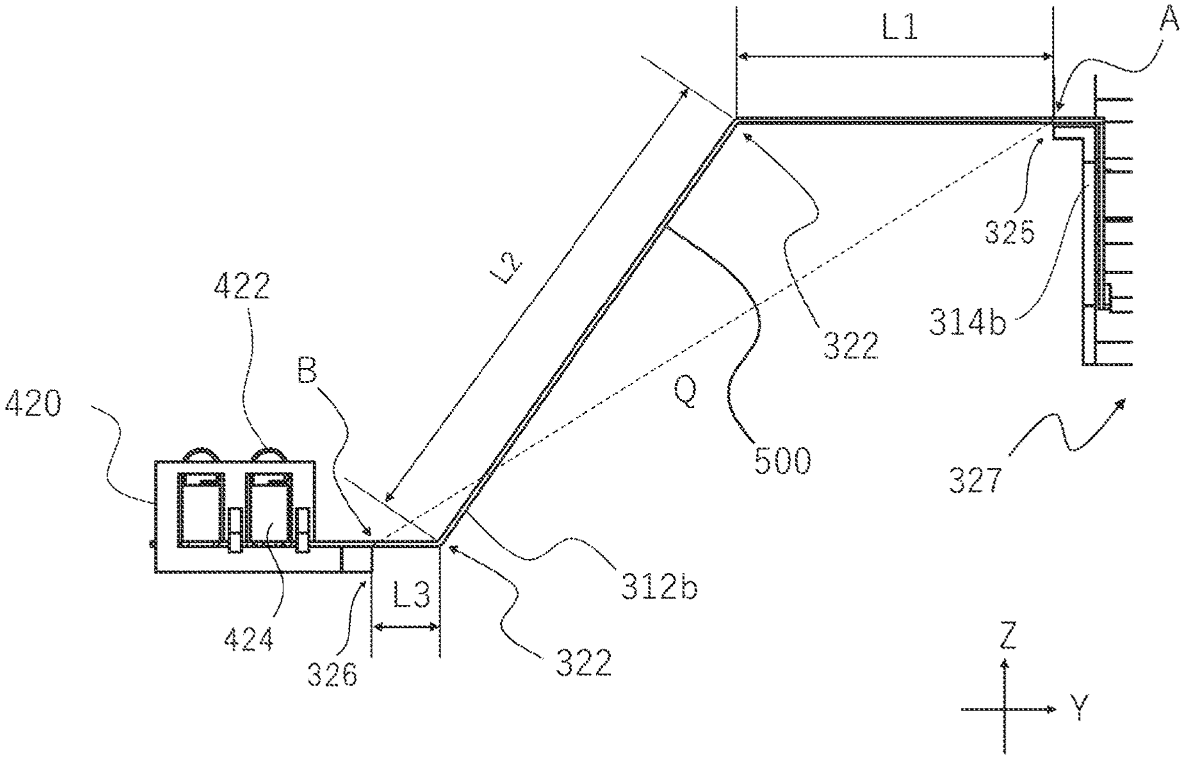
FIG. 19 is a schematic view illustrating a high-voltage cable.

As illustrated in FIG. 19, the development high-voltage cable 312*b* is disposed in the support frame body 78 in such a shape that the cable is bent at least at one location between the second holding portion 314*b* of the board contact unit 327 and the third cable holding unit 420. In other words, the development high-voltage cable 312*b* has the bent portion 322 (here, two portions) between the second holding portion 314*b* and the third cable holding unit 420. The development high-voltage cable 312*b* has the bent portion 322 to couple the second holding portion 314*b* and the third cable holding unit 420 in a state where there is an extra length.

The portion of the development high-voltage cable 312*b* where the bent portion 322 is provided is not held by any member such as the second holding portion 314*b* or the third cable holding unit 420. Similarly, although not illustrated, a portion of the charging high-voltage cable 312*a* where the bent portion 322 is provided is not held by any member such as the first holding portion 314*a* and the second cable holding unit 410. The portion of the transfer high-voltage cable 312*c* where the bent portion 322 is provided is not held by any member such as the third holding portion 314*c* or the second cable holding unit 410. The place where the bent portion 322 is provided in the discharging high-voltage cable 312*d* is not held by any member such as the fourth holding portion 314*d* or the first cable holding unit 400. The portion of the blade high-voltage cable 312*e* where the bent portion 322 is provided is not held by any member such as the fifth holding portion 314*e* or the third cable holding unit 420.

The development high-voltage cable 312*b* is held by the second holding portion 314*b* so as not to move in the Z direction from the positive side in the Y direction to the position 325 of the "portion A", and is held by the third cable holding unit 420 so as not to move in the Z direction from the negative side in the Y direction to the position 326 of the "portion B". The length from the position 325 of the "portion A" to the position 326 of the "portion B" of the development high-voltage cable 312*b* is "L1+L2+L3" as illustrated in the drawing, and is longer than the length of the line segment Q connecting the position 325 of the "portion A" and the position 326 of the "portion B". Here, the position 325 of the "portion A" is a first position where a portion of the second holding portion 314*b* where the development high-voltage cable 312*b* is not held is exposed from the second holding portion 314*b*. On the other hand, the position 326 of the "portion B" is a second position where a portion where the development high-voltage cable 312*b* is not held in the third cable holding unit 420 is exposed from the third cable holding unit 420. In the development high-voltage cable 312*b*, a portion between the position 325 of the "portion A" and the position 326 of the "portion B" is defined as a central portion 500. As described above, the central portion 500 of the development high-voltage cable 312*b* is longer than the line segment Q connecting the position 325 of "portion A", which is the first position exposed from the second holding portion 314*b*, and the position 326 of the "portion B", which is the second position exposed from the third cable holding unit 420.

As described above, the central portion 500 does not linearly connect the second holding portion 314*b* of the board contact unit 327 and the third cable holding unit 420, but connects them via the two bent portions 322. Note that the location of the bent portion 322 formed in the central portion 500 may be any number of locations as long as the location is one or more. The bent portion 322 is not limited to a shape having an inflection point, and may have a curved shape or the like. In addition, the central portion 500 is not held by the board contact unit 327 and the third cable holding unit 420, and is in a state of floating in the air. Therefore, the central portion 500 is deformable.

Next, connection by the high-voltage contact unit 350 for securing contact between each contact and the development high-voltage cable 312*b* in a case where the relative position between the developing contact 304*a* and the developing board contact 303 is changed due to a manufacturing error will be described with reference to FIGS. 20A to 20C while referring to FIGS. 14 and 17. Hereinafter, a case where the arrangement of the third cable holding unit 420 is changed with reference to the second holding portion 314*b* in response to a change in the arrangement of the process unit 40 due to a manufacturing error will be described as an example.

Figure 20A:
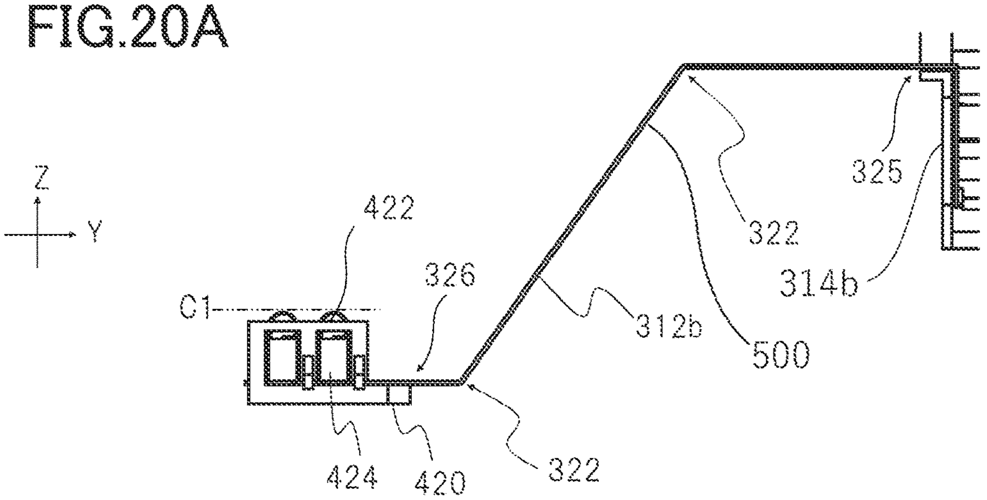
FIG. 20A is a schematic view illustrating the high-voltage contact unit in a state where no positional deviation occurs from the reference position.

FIG. 20A illustrates a case where the process unit 40 is arranged at the correct position and the arrangement of the third cable holding unit 420 does not change from the reference position. In this case, no positional deviation occurs between the developing contact 304*a* and the developing board contact 303. It is assumed that the distal end position of the developing contact portion 422 in the Z direction at this time is a position of "C1".

Figure 20B:
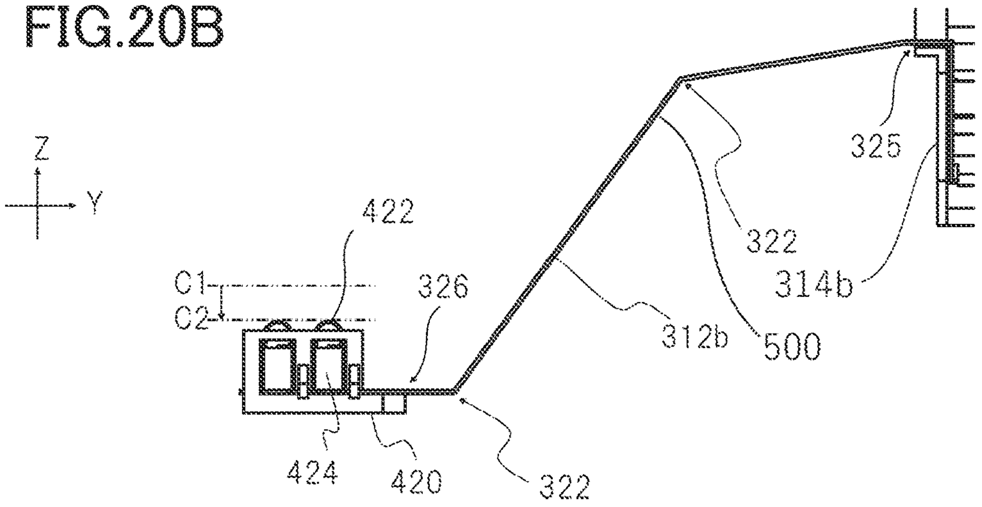
FIG. 20B is a schematic view illustrating the high-voltage contact unit in a state where a positional deviation occurs on a minus side in the Z direction from the reference position.

FIG. 20B illustrates a case where the process unit 40 is not arranged at a correct position due to a manufacturing error, the developing contact 304*a* is shifted to the minus side in the Z direction, and the arrangement of the third cable holding unit 420 is accordingly changed from the reference position to a position shifted to the minus side in the Z direction. In this case, since the developing contact 304*a* is shifted to the minus side in the Z direction, the distal end position of the developing contact portion 422 in the Z direction is at a position of "C2" below "C1". Therefore, the development high-voltage cable 312*b* is pulled by the third cable holding unit 420 and is deformed following the third cable holding unit 420 according to the extra length.

Figure 20C:
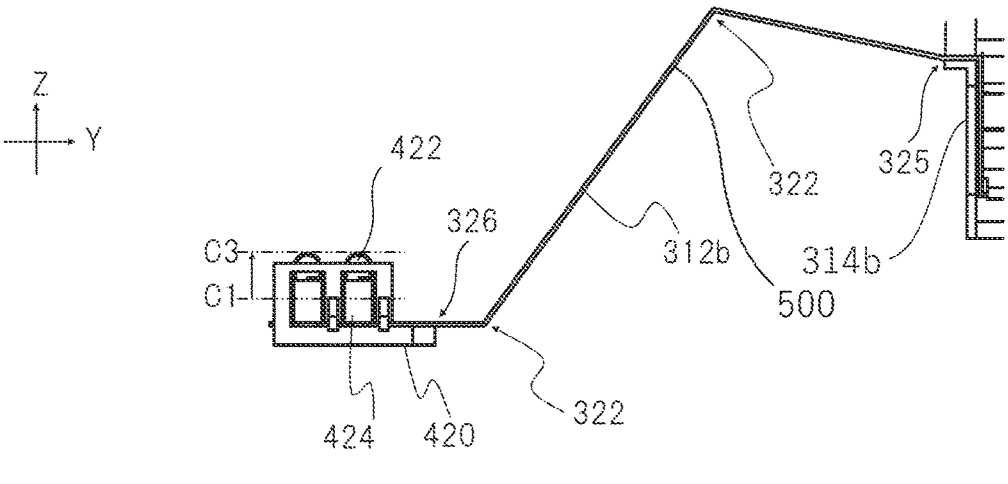
FIG. 20C is a schematic view illustrating the high-voltage contact unit in a state where a positional deviation occurs on a plus side in the Z direction from the reference position.

FIG. 20C illustrates a case where the process unit 40 is not disposed at the correct position due to a manufacturing error, the developing contact 304*a* is shifted to the plus side in the Z direction, and the arrangement of the third cable holding unit 420 is changed from the reference position to a position shifted to the plus side in the Z direction accordingly. In this case, since the developing contact 304*a* is shifted to the plus side in the Z direction, the distal end position of the developing contact portion 422 in the Z direction is at a position of "C3" above "C1". Therefore, the development high-voltage cable 312*b* is lifted by the third cable holding unit 420 and is deformed following the third cable holding unit 420 according to the extra length.

As described above, when the third cable holding unit 420 is disposed to be relatively shifted from the reference position with respect to the second holding portion 314*b*, the development high-voltage cable 312*b* is deformed following the third cable holding unit 420. As a result, the second holding portion 314*b* and the third cable holding unit 420 can be attached without hindering each other. In addition, the third cable holding unit 420 can be accurately attached to the vicinity of the process unit 40 without being affected by the attachment position of the second holding portion 314*b*. Therefore, electrical connection by the development high-voltage cable 312*b* can be secured, and thus a stable contact configuration capable of appropriately supplying a voltage to the developing roller 12 can be realized.

Even when the third cable holding unit 420 is disposed to be shifted in the X direction or the Y direction, the development high-voltage cable 312*b* is deformed following the third cable holding unit 420 according to the extra length, so that electrical connection by the development high-voltage cable 312*b* can be secured.

Note that the wire diameter of the development high-voltage cable 312*b* is not limited to the diameter "0.5 mm or more and 0.7 mm or less", and may be any thickness that can be deformed as described above according to the relative positional displacement between the third cable holding unit 420 and the second holding portion 314*b*.

As described above, in the present exemplary embodiment, the high-voltage contact unit 350 is divided into the board contact unit and the cable holding unit (400, 410, 420), and each of the board contact unit 327 and the cable holding unit holds only both ends of the high-voltage cable (312*a* to 312*e*). In this case, since the amount of the flame-retardant member used to form the high-voltage contact unit 350 can be reduced, the cost can be reduced. In addition, since the board contact and the operation unit contact can be connected at a relatively short distance, the length of the high-voltage cable (312*a* to 312*e*) can be shortened, and the cost can be reduced. The high-voltage cables (312*a* to 312*e*) each have a bent shape, and connect the board contact unit 327 and the cable holding unit (400, 410, 420) with an extra length. Thus, even if the arrangement positions of the board contact unit 327 and the cable holding unit (400, 410, 420) are changed due to a manufacturing error or the like, the high-voltage cables (312*a* to 312*e*) are deformed following the arrangement thereof. As a result, it is possible to ensure electrical connection by the high-voltage cables (312*a* to 312*e*), and thus, it is possible to realize a stable contact configuration capable of appropriately supplying a voltage to the operation unit. As described above, in the present exemplary embodiment, the influence of the positional deviation between the divided board contact unit 327 and the cable holding unit (400, 410, 420) can be suppressed while suppressing the cost, and the voltage necessary for the image formation can be stably supplied without impairing the positional accuracy of the contacts.

As described above, in the present exemplary embodiment, as illustrated in FIGS. 6 and 7, the operator accesses the inside of the image forming apparatus 1 from the back side to perform maintenance work such as replacement of the process unit 40. That is, since the operator cannot access the inside of the image forming apparatus 1 from the front side, even if only both ends of the high-voltage cables (312*a* to 312*e*) are held and the central portion 500 is exposed in a floating state in the air, the operator can be prevented from touching the exposed high-voltage cables (312*a* to 312*e*).

Second Exemplary Embodiment

Next, a high-voltage contact unit according to a second exemplary embodiment will be described with reference to FIGS. 21 to 24C while referring to FIGS. 2, 4, 12, and 13. Note that the high-voltage contact unit of the second exemplary embodiment is different from the high-voltage contact unit 350 of the first exemplary embodiment described above (see FIG. 13) in the configuration of the board contact unit 327A, and the other configurations are similar. Therefore, in the following description, the same reference numerals are given to the same configurations as those of the first exemplary embodiment, and the description thereof is simplified or omitted.

Figure 21:
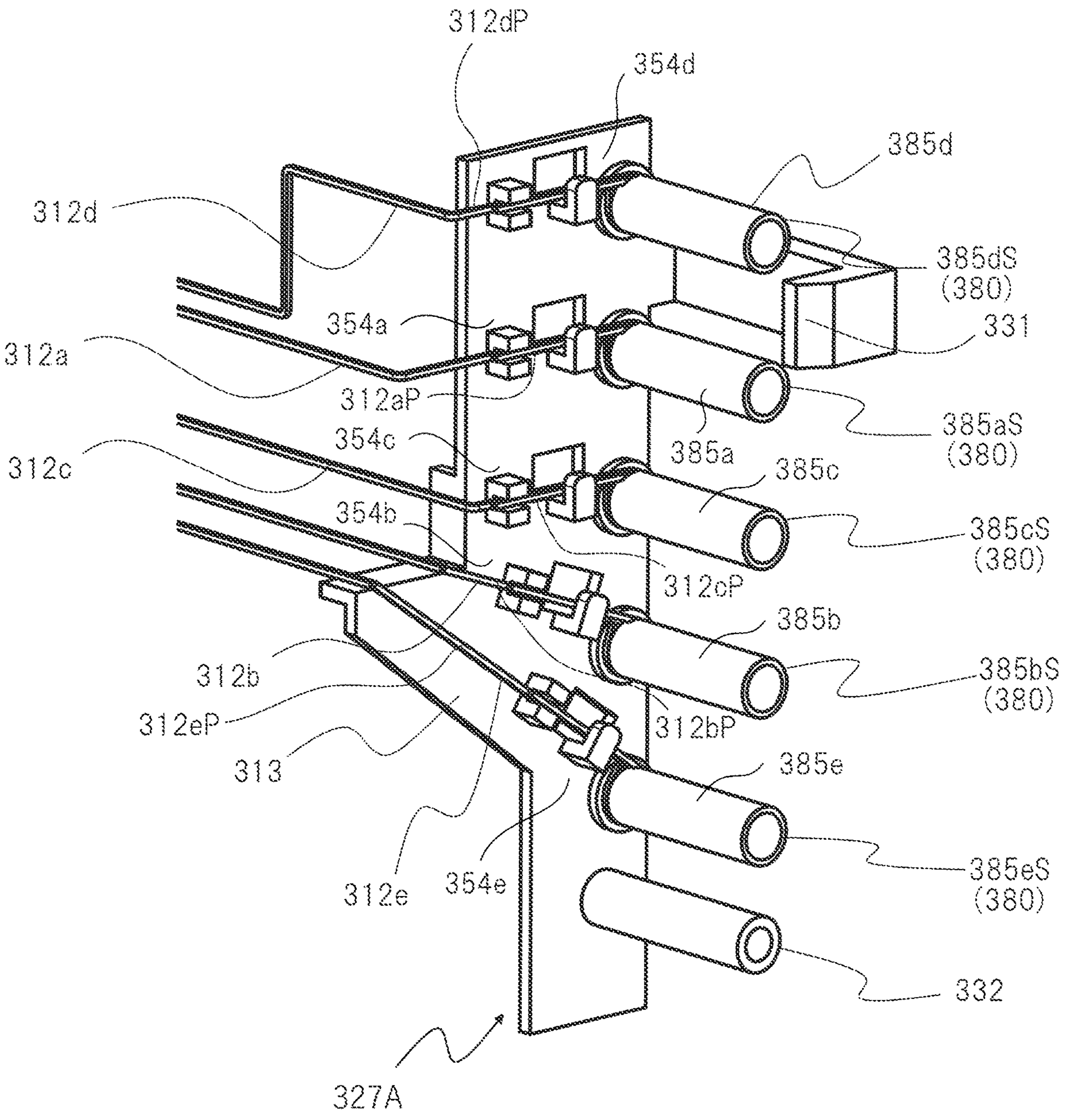
FIG. 21 is a schematic view illustrating a board contact unit of a second exemplary embodiment.

FIG. 21 is a perspective view illustrating a board contact unit 327A. As illustrated in FIG. 21, the board contact unit 327A includes a plurality of holding portions (354*a* to 354*e*) that respectively hold first ends (312*a*P to 312*e*P) of a plurality of high-voltage cables (312*a* to 312*e*), and one support plate 313 that supports the holding portions (354*a* to 354*e*). The holding portions (354*a* to 354*e*) are integrally formed with the support plate 313.

In the present exemplary embodiment, the first holding portion 354*a* holds a first end 312*a*P of the charging high-voltage cable 312*a* that is electrically connected to the charging contact 302*a* of the charge roller 17 to supply a charging voltage. The second holding portion 354*b* holds a first end 312*b*P of the development high-voltage cable 312*b* that is electrically connected to the developing contact 304*a* of the developing roller 12 to supply a developing voltage. The third holding portion 354*c* holds a first end 312*c*P of the transfer high-voltage cable 312*c* that is electrically connected to the transfer contact 306*a* (see FIG. 16) of the transfer roller 7*a* to supply a transfer voltage. The fourth holding portion 314*d* holds a first end 312*d*P of a discharging high-voltage cable 312*d* that is electrically connected to the discharging contact 308*a* of the discharging device 13 to supply a discharging voltage. The fifth holding portion 315*e* holds a first end 312*e*P of the blade high-voltage cable 312*e* that is electrically connected to the blade contact 310*a* of the developing blade 19 and supplies a blade voltage.

Figure 22:
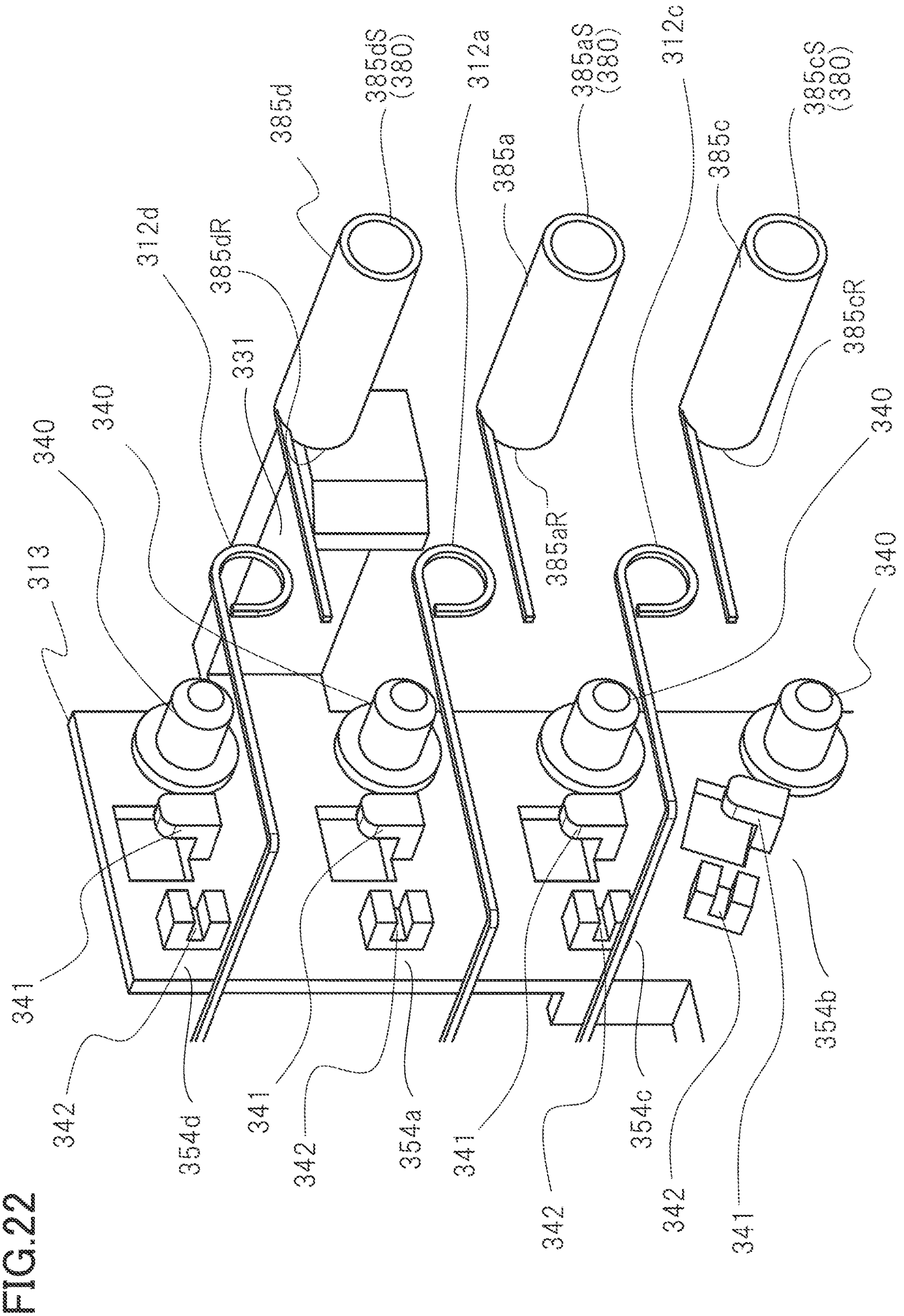
FIG. 22 is an exploded view illustrating a board contact unit of the second exemplary embodiment.

As illustrated in FIGS. 21 and 22, the holding portions (354*a* to 354*e*) include compression springs (385*a* to 385*e*) serving as first urging portion, respectively. In the present exemplary embodiment, the compression springs (385*a* to 385*e*) have first ends (385*a*R to 385*e*R) and second ends (385*a*S to 385*e*S) in the extending direction of the compression springs. The first end (385*a*R to 385*e*R) of the compression spring (385*a* to 385*e*) is in contact with a first end (312*a*P to 312*e*P) of the high-voltage cable (312*a* to 312*e*), and the second end (385*a*S to 385*e*S) is in contact with each board contact (301, 303, 305, 307, 309) of the circuit board 100. That is, the second ends (385*a*S to 385*e*S) of the compression springs (385*a* to 385*e*) constitute the board contact portion 380 that conducts the circuit board 100 and the high-voltage cables (312*a* to 312*e*).

As illustrated in FIG. 22, third holding portion 354*c* is provided with a boss 340, a claw 341, and a restriction rib 342. The boss 340 holds the coil of the compression spring 385*c* and holds the end of the transfer high-voltage cable 312*c*. The claw 341 locks the transfer high-voltage cable 312*c* and restricts the movement of the coil portion of the compression spring 385*c* in a direction in which the coil portion is detached from the boss 340. The restriction rib 342 restricts the movement of the transfer high-voltage cable 312*c* so that the transfer high-voltage cable 312*c* does not come off the claw 329. The holding portions (354*a*, 354*b*, 354*c*, 354*e*) other than the third holding portion 354*c* have the same configuration as the third holding portion 354*c*, and thus description thereof is omitted here.

The compression springs (385*a* to 385*e*) come into contact with the respective high-voltage cables (312*a* to 312*e*) in a compressed state, and urge the board contact portion 380 toward the respective board contacts (301, 303, 305, 307, 309). The board support portion 331 and the attachment portion 332 are provided on the support plate 313 in order to bring the compression springs (385*a* to 385*e*) into contact with the high-voltage cables (312*a* to 312*e*) and the board contacts (301, 303, 305, 307, 309) with a predetermined pressing force.

Figure 23:
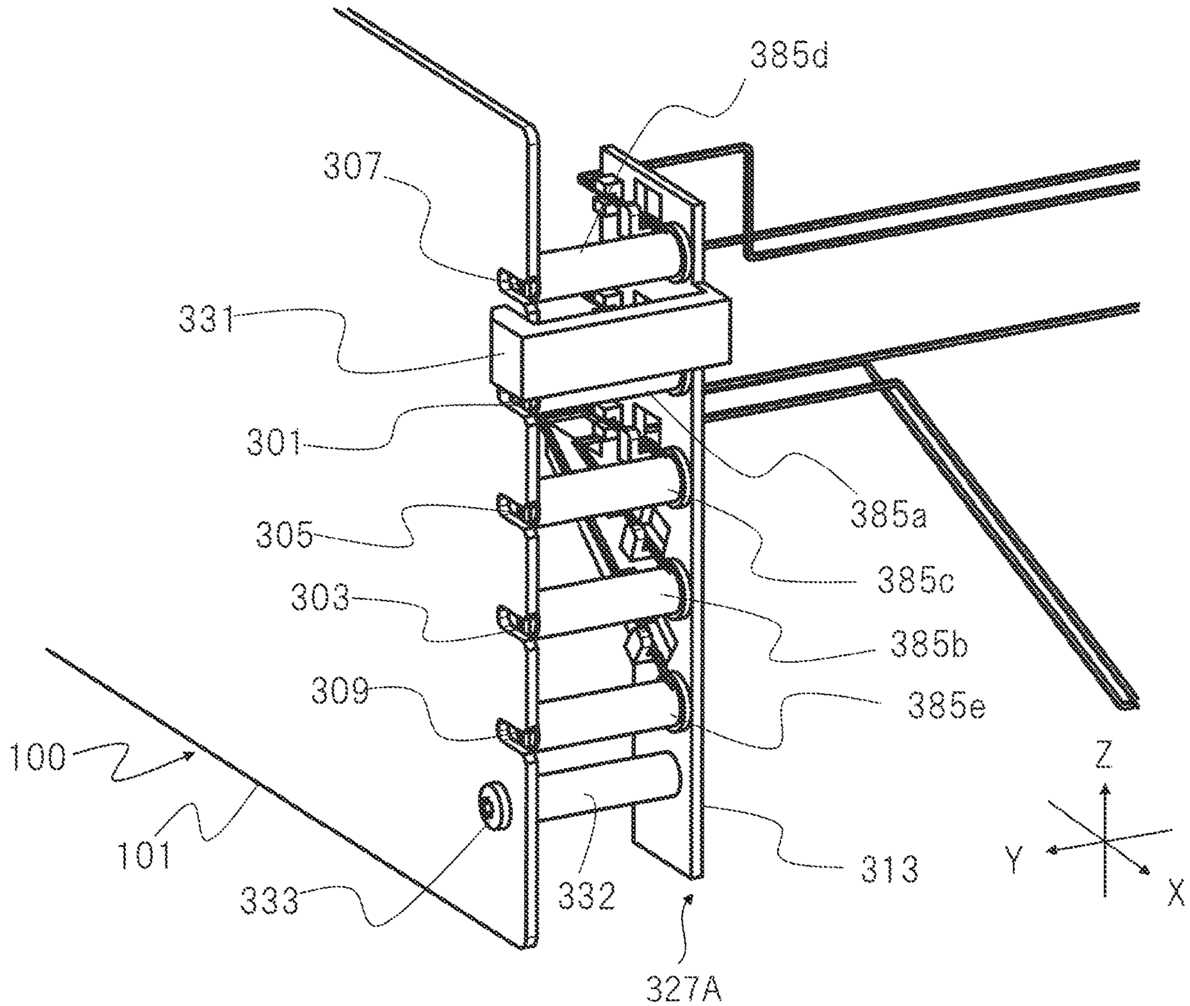
FIG. 23 is a schematic view illustrating a board contact unit and a circuit board of the second exemplary embodiment.

As illustrated in FIG. 23, the distal end of the board support portion 331, serving as a first support portion, is formed in a hook shape, and holds and supports the circuit board 100 from the positive side in the Y direction in a state where the compression springs (385*a* to 385*e*) are sandwiched and compressed between the support plate 313 and the circuit board 100. On the other hand, the attachment portion 332 abuts on a surface of the circuit board 100 opposite to a surface locked by the board support portion 331, and is fixed to the circuit board 100 with a screw 333. As a result, the compression springs (385*a* to 385*e*) reliably contact the high-voltage cables (312*a* to 312*e*) and the board contacts (301, 303, 305, 307, 309) on both end sides. The attachment portion 332 is provided at a position away from the board support portion 331 in the Z direction so that the circuit board 100 is not deflected by the pressing force of the compression springs (385*a* to 385*e*).

Figure 24A:
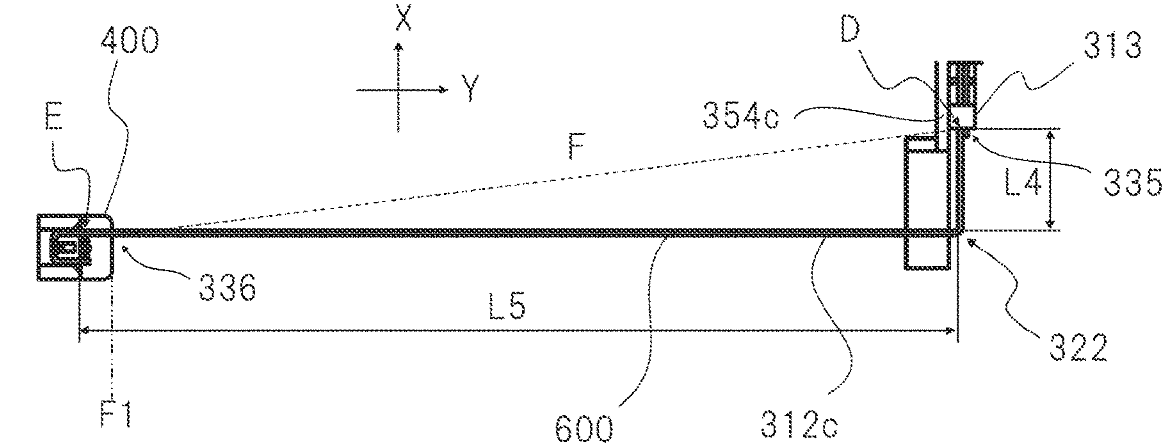
FIG. 24A is a schematic view illustrating the high-voltage contact unit in a state where no positional displacement is caused from the reference position.

Next, the high-voltage cables (312*a* to 312*e*) will be described. Hereinafter, the transfer high-voltage cable 312*c* will be described as a representative example. As illustrated in FIG. 24A, the transfer high-voltage cable 312*c* is disposed in a shape bent at least at one place between the third holding portion 354*c* and the first cable holding unit 400 in the support frame body. In other words, the transfer high-voltage cable 312*c* has the bent portion 322 (here, one location) between the third holding portion 354*c* and the first cable holding unit 400. The transfer high-voltage cable 312*c* has the bent portion 322 to connect the third holding portion 354*c* and the first cable holding unit 400 in a state where there is an extra length.

The transfer high-voltage cable 312*c* is held by the third holding portion 354*c* so as not to move in the Y direction from the positive side in the X direction to the position 335 of the "portion D", and is held by the first cable holding unit 400 so as not to move in the Z direction from the negative side in the Y direction to the position 336 of the "portion E". The length from the position 335 of the "portion D" to the position 336 of the "portion E" of the transfer high-voltage cable 312*c* is "L4+L5" as illustrated in the drawing, and is longer than the length of the line segment F connecting the position 335 of the "portion D" and the position 336 of the "portion E". The position 335 of "portion D" is a first position where a portion where the transfer high-voltage cable 312*c* is not held in the third holding portion 354*c* is exposed from the third holding portion 354*c*. On the other hand, the position 336 of the "portion E" is the second position where the portion where the transfer high-voltage cable 312*c* is not held in the first cable holding unit 400 is exposed from the first cable holding unit 400. In the transfer high-voltage cable 312*c*, a portion between the position 335 of the "portion D" and the position 336 of the "portion E" is defined as a central portion 600. As described above, the central portion 600 of the transfer high-voltage cable 312*c* is longer than the line segment F connecting the position 335 of the "portion D", which is the first position exposed from the third holding portion 354*c*, and the position 336 of the "portion E", which is the second position exposed from the first cable holding unit 400. The transfer high-voltage cable 312*c* is formed to have a wire diameter that bends when receiving a load.

As described above, the central portion 600 does not linearly connect the third holding portion 354*c* of the board contact unit 327 and the first cable holding unit 400, but connects them via one bent portion 322. Note that the location of the bent portion 322 formed in the central portion 600 may be any number of locations as long as the location is one or more. The bent portion 322 is not limited to a shape having an inflection point, and may have a curved shape or the like. The central portion 600 is not held by the board contact unit 327A and the first cable holding unit 400, and is in a state of floating in the air. Therefore, the central portion 600 is deformable.

Next, a description will be given of connection by the high-voltage contact unit of the second exemplary embodiment that ensures contact between each contact and the transfer high-voltage cable 312*c* when the relative position between the transfer contact 306*a* and the transfer board contact 305 changes due to a manufacturing error. Hereinafter, a case where the arrangement of the first cable holding unit 400 is changed with reference to the third holding portion 354*c* in response to a change in the arrangement of the process unit 40 due to a manufacturing error will be described as an example.

FIG. 24A illustrates a case where the process unit 40 is arranged at the correct position, and the arrangement of the first cable holding unit 400 does not change from the reference position. In this case, no positional deviation occurs between the transfer contact 306*a* and the transfer board contact 305. A distal end position of the transfer contact plate 401 in the Z direction at this time is assumed to be a position of "F1".

Figure 24B:
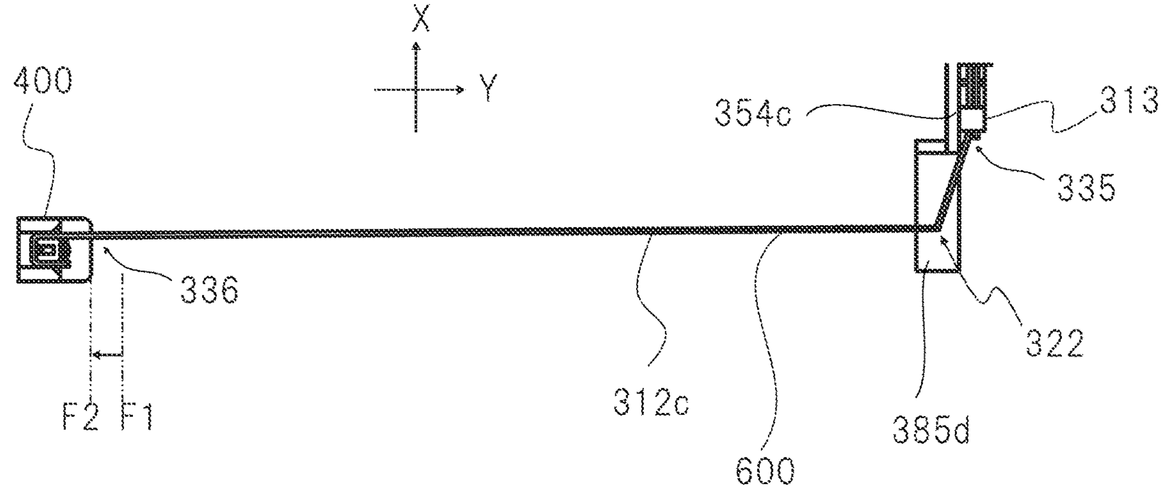
FIG. 24B is a schematic view illustrating the high-voltage contact unit in a state where a positional displacement is caused on a minus side in the Y direction from the reference position.

FIG. 24B illustrates a case where the process unit 40 is not arranged at a correct position due to a manufacturing error, the transfer contact 306*a* is shifted to the minus side in the Y direction, and the arrangement of the first cable holding unit 400 is accordingly changed to a position shifted from the reference position to the minus side in the Y direction. In this case, since the transfer contact 306*a* is shifted to the minus side in the Y direction, the distal end position of the transfer contact plate 401 in the Y direction becomes a position of "F2" on the left side of "F1". Therefore, the transfer high-voltage cable 312*c* is pulled by the first cable holding unit 400 and is deformed following the first cable holding unit 400 according to the extra length.

Figure 24C:
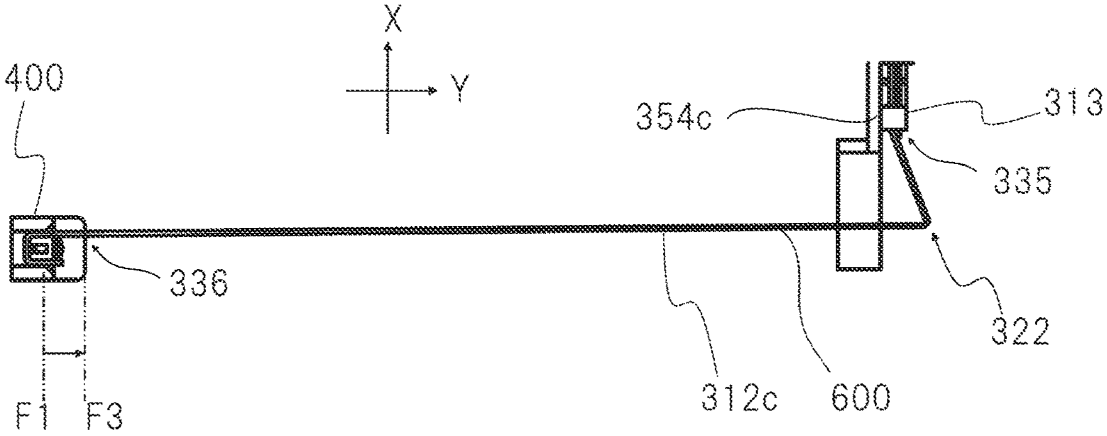
FIG. 24C is a schematic view illustrating the high-voltage contact unit in a state where a positional displacement is caused on a plus side in the Y direction from the reference position.

FIG. 24C illustrates a case where the process unit 40 is not arranged at a correct position due to a manufacturing error, the transfer contact 306*a* is shifted to the plus side in the Y direction, and the arrangement of the first cable holding unit 400 is accordingly changed from the reference position to a position shifted to the plus side in the Y direction. In this case, since the transfer contact 306*a* is shifted to the plus side in the Y direction, the distal end position of the transfer contact plate 401 in the Y direction is at a position of "F3" on the right side of "F1". Therefore, the transfer high-voltage cable 312*c* is pushed by the first cable holding unit 400 and is deformed following the first cable holding unit 400 according to the extra length.

As described above, when the first cable holding unit 400 is disposed to be relatively shifted from the reference position with respect to the third holding portion 354*c*, the transfer high-voltage cable 312*c* is deformed following the first cable holding unit 400. Thus, the third holding portion 354*c* and the first cable holding unit 400 can be attached without hindering each other. In addition, the first cable holding unit 400 can be accurately mounted in the vicinity of the process unit 40 without being affected by the mounting position of the third holding portion 354*c*. Therefore, electrical connection by the transfer high-voltage cable 312*c* can be secured, and thus a stable contact configuration capable of appropriately supplying a voltage to the transfer roller 7*a* can be realized.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205728, filed Dec. 20, 2021, which is hereby incorporated by reference herein in its entirety

What is claimed is:

1. An image forming apparatus for forming an image on a recording material, the image forming apparatus comprising:

an image bearing member configured to rotate around a rotation axis and bear a toner image;

an exposure unit configured to expose a surface of the image bearing member;

a voltage control board configured to control an input voltage, the voltage control board including a contact of the voltage control board;

an operation component that operates in response to supply of a controlled voltage from the voltage control board, the operation component including a contact;

a wire electrically connecting the voltage control board and the operation component;

a first holding unit holding a first end portion of the wire electrically connected to the contact of the voltage control board; and a second holding unit provided separately from the first holding unit and holding a second end portion of the wire electrically connected to the contact of the operation component, wherein the wire is bent in at least one portion, between the first end portion held by the first holding unit and the second end portion held by the second holding unit, which is not in contact with either the first holding unit or the second holding unit, wherein the first holding unit and the second holding unit are disposed in different positions in an intersecting direction along a horizontal direction, the intersecting direction intersecting a direction of the rotation axis, and wherein the exposure unit is disposed between the voltage control board and the operation component in the intersecting direction.

2. The image forming apparatus according to claim 1, wherein a length of a wire portion of the wire between the first holding unit and the second holding unit is longer than a line segment linearly connecting the first holding unit and the second holding unit.

3. The image forming apparatus according to claim 2, wherein the wire portion between the first holding unit and the second holding unit is suspended in air.

4. The image forming apparatus according to claim 2, wherein the wire portion between the first holding unit and the second holding unit is deformable.

5. The image forming apparatus according to claim 1, wherein:

the first holding unit includes:

- a first contact portion that is in contact with the contact of the voltage control board and is electrically connected to the first end portion of the wire; and
- a first spring configured to urge the first contact portion toward the contact of the voltage control board, the second holding unit includes:

- a second contact portion that is in contact with the contact of the operation component and is electrically connected to the second end portion of the wire; and
- a second spring configured to urge the second contact portion toward the contact of the operation component.

6. The image forming apparatus according to claim 5, wherein the first spring is a torsion coil spring formed integrally with the first end portion of the wire.

7. The image forming apparatus according to claim 5, wherein the first holding unit includes an alignment portion, including a protrusion that extends into an opening of the voltage control board, to position the first holding unit with respect to the voltage control board in a state where the first contact portion is in contact with the contact of the voltage control board.

8. The image forming apparatus according to claim 5, wherein:

the first spring is a compression spring, a first end portion, in an expansion/contraction direction, of the compression spring is in contact with the first end portion of the wire, and a second end portion, in the expansion/contraction direction, of the compression spring is the first contact portion that is in contact with the contact of the voltage control board.

9. The image forming apparatus according to claim 8, wherein the first holding unit includes a first support portion configured to support the voltage control board in a state where the compression spring is sandwiched and compressed between the first holding unit and the voltage control board.

10. The image forming apparatus according to claim 1, wherein:

the operation component is a first operation component and the contact of the first operation component is a first contact, the image forming apparatus further comprises:

a support frame body;

a second operation component configured to operate in response to supply of a voltage, the second operation component including a second contact; and a cartridge that is detachably attached to the support frame body and is configured to support the first operation component and the second operation component, the first contact is disposed on an upper surface of the cartridge, and the second contact is disposed on a lower surface of the cartridge.

11. The image forming apparatus according to claim 1, wherein the operation component is a charging unit configured to charge the image bearing member.

12. The image forming apparatus according to claim 1, wherein the operation component is a developing unit configured to develop an electrostatic latent image formed on the image bearing member as the toner image.

13. The image forming apparatus according to claim 1, wherein the operation component is a transfer unit configured to transfer the toner image borne on the image bearing member to the recording material.

14. The image forming apparatus according to claim 1, wherein the operation component is a restricting unit configured to restrict a thickness of toner borne on the image bearing member.

15. The image forming apparatus according to claim 1, wherein the operation component is a discharging unit configured to discharge a surface of the image bearing member.

16. The image forming apparatus according to claim 1, wherein an entire portion of the wire between the first end portion and the second end portion of the wire is suspended in air.

* * * * *